United States Patent [19]

Uchida et al.

[11] Patent Number: 5,691,819
[45] Date of Patent: Nov. 25, 1997

[54] APPARATUS FOR PRODUCING A LEGIBLE VIDEO IMAGE DURING HIGH SPEED REPRODUCTION OF A DIGITAL VIDEO SIGNAL

[75] Inventors: Hirofumi Uchida, Neyagawa; Tatsuro Juri, Osaka, both of Japan

[73] Assignee: Matsushita Electric Industrial Co., Ltd., Kadoma, Japan

[21] Appl. No.: 197,490

[22] Filed: Feb. 16, 1994

[30] Foreign Application Priority Data

Feb. 17, 1993 [JP] Japan ................... 5-027691

[51] Int. Cl.$^6$ .................................................. H04N 9/79
[52] U.S. Cl. .......................... 358/310; 358/335; 360/32; 360/48
[58] Field of Search ........................ 358/335, 310, 358/342; 360/9.1, 32, 48; H04N 5/76, 5/78, 5/781, 5/782, 5/783, 5/92, 9/79

[56] References Cited

U.S. PATENT DOCUMENTS

| 5,175,631 | 12/1992 | Juri et al. . | |
| 5,301,018 | 4/1994 | Smidth et al. . | |
| 5,309,292 | 5/1994 | Takakura | 360/48 |
| 5,341,250 | 8/1994 | Uchida et al. | 360/48 |
| 5,430,579 | 7/1995 | Onishi et al. | 360/32 |

FOREIGN PATENT DOCUMENTS

| 471118 | 2/1992 | European Pat. Off. . |
| 499303 | 8/1992 | European Pat. Off. . |
| 5252476 | 9/1993 | Japan . |

OTHER PUBLICATIONS

Lee et al: "A Study on New DCT–Based Bit Rate Reduction Algorithm and Varible Speed Playback for a Home–Use Digital VCR", IEEE Transactions on Consumer Electronics, vol. 38, No. 3, Aug. 1992, pp. 236–241.

Patent Abstracts of Japan, vol. 13, No. 195, (E–754) May 10, 1989, & JP–A–01 016 193, Jan. 19, 1989.

Patent Abstracts of Japan, vol. 17, No. 15, (E–1305) Jan. 12, 1993 & JP–A–04 245 881, Sep. 2, 1992.

Patent Abstracts of Japan, vol. 16, No. 564, (E–1295) Dec. 4, 1992, & JP–A–04 217 197, Aug. 7, 1992.

Patent Abstract of Japan, vol. 12, No. 393 (E–670) Oct. 19, 1988, & JP–A–63 133 764, Jun. 6, 1988.

*Primary Examiner*—Thai Q. Tran
*Attorney, Agent, or Firm*—Cushman, Darby & Cushman

[57] ABSTRACT

A video image of one frame is divided into a plurality of super blocks, and each super block comprises a plurality of macro blocks. A video segment comprising five macro blocks taken out from five super blocks located apart from each other on the video image, and data compression operation is applied in the video segment. After data compression, the macro blocks in the video segment are rearranged in the original order, and are formed to corresponding SYNC block data to record on a magnetic tape.

7 Claims, 19 Drawing Sheets

FIG. 5(b)

| | | | | | |
|---|---|---|---|---|---|
| TOP | $S_{0,0}$ | $S_{0,1}$ | $S_{0,2}$ | $S_{0,3}$ | $S_{0,4}$ |
| | $S_{1,0}$ | $S_{1,1}$ | $S_{1,2}$ | $S_{1,3}$ | $S_{1,4}$ |
| | $S_{2,0}$ | $S_{2,1}$ | $S_{2,2}$ | $S_{2,3}$ | $S_{2,4}$ |
| | $S_{3,0}$ | $S_{3,1}$ | $S_{3,2}$ | $S_{3,3}$ | $S_{3,4}$ |
| | $S_{4,0}$ | $S_{4,1}$ | $S_{4,2}$ | $S_{4,3}$ | $S_{4,4}$ |
| LEFT | $S_{5,0}$ | $S_{5,1}$ | $S_{5,2}$ | $S_{5,3}$ | $S_{5,4}$ | RIGHT |
| | $S_{6,0}$ | $S_{6,1}$ | $S_{6,2}$ | $S_{6,3}$ | $S_{6,4}$ |
| | $S_{7,0}$ | $S_{7,1}$ | $S_{7,2}$ | $S_{7,3}$ | $S_{7,4}$ |
| | $S_{8,0}$ | $S_{8,1}$ | $S_{8,2}$ | $S_{8,3}$ | $S_{8,4}$ |
| | $S_{9,0}$ | $S_{9,1}$ | $S_{9,2}$ | $S_{9,3}$ | $S_{9,4}$ |
| | $S_{10,0}$ | $S_{10,1}$ | $S_{10,2}$ | $S_{10,3}$ | $S_{10,4}$ |
| BOTTOM | $S_{11,0}$ | $S_{11,1}$ | $S_{11,2}$ | $S_{11,3}$ | $S_{11,4}$ |

(625/50 SYSTEM)

SUPER BLOCK $S_{i,4}$ (i=0,...,9)

525/60 SYSTEM

FIG. 6(d)

SUPER BLOCK $S_{ij}$ (i=0,...,11, j=0,...,4)

625/50 SYSTEM

FIG. 13

| $U_{0,4,26}$ | $U_{1,4,26}$ | ... | $U_{i,4,26}$ | $U_{i+1,4,26}$ | ... | $U_{n-1,4,26}$ |
|---|---|---|---|---|---|---|
| $U_{0,4,25}$ | $U_{1,4,25}$ | ... | $U_{i,4,25}$ | $U_{i+1,4,25}$ | ... | $U_{n-1,4,25}$ |
| ⋮ | ⋮ | | ⋮ | ⋮ | | ⋮ |
| $U_{0,4,0}$ | $U_{1,4,0}$ | ... | $U_{i,4,0}$ | $U_{i+1,4,0}$ | ... | $U_{n-1,4,0}$ |
| $U_{0,3,26}$ | $U_{1,3,26}$ | ... | $U_{i,3,26}$ | $U_{i+1,3,26}$ | ... | $U_{n-1,3,26}$ |
| $U_{0,3,25}$ | $U_{1,3,25}$ | ... | $U_{i,3,25}$ | $U_{i+1,3,25}$ | ... | $U_{n-1,3,25}$ |
| ⋮ | ⋮ | | ⋮ | ⋮ | | ⋮ |
| $U_{0,3,0}$ | $U_{1,3,0}$ | ... | $U_{i,3,0}$ | $U_{i+1,3,0}$ | ... | $U_{n-1,3,0}$ |
| $U_{0,2,26}$ | $U_{1,2,26}$ | ... | $U_{i,2,26}$ | $U_{i+1,2,26}$ | ... | $U_{n-1,2,26}$ |
| $U_{0,2,25}$ | $U_{1,2,25}$ | ... | $U_{i,2,25}$ | $U_{i+1,2,25}$ | ... | $U_{n-1,2,25}$ |
| ⋮ | ⋮ | | ⋮ | ⋮ | | ⋮ |
| $U_{0,2,0}$ | $U_{1,2,0}$ | ... | $U_{i,2,0}$ | $U_{i+1,2,0}$ | ... | $U_{n-1,2,0}$ |
| $U_{0,1,26}$ | $U_{1,1,26}$ | ... | $U_{i,1,26}$ | $U_{i+1,1,26}$ | ... | $U_{n-1,1,26}$ |
| $U_{0,1,25}$ | $U_{1,1,25}$ | ... | $U_{i,1,25}$ | $U_{i+1,1,25}$ | ... | $U_{n-1,1,25}$ |
| ⋮ | ⋮ | | ⋮ | ⋮ | | ⋮ |
| $U_{0,1,0}$ | $U_{1,1,0}$ | ... | $U_{i,1,0}$ | $U_{i+1,1,0}$ | ... | $U_{n-1,1,0}$ |
| $U_{0,0,26}$ | $U_{1,0,26}$ | ... | $U_{i,0,26}$ | $U_{i+1,0,26}$ | ... | $U_{n-1,0,26}$ |
| $U_{0,0,25}$ | $U_{1,0,25}$ | ... | $U_{i,0,25}$ | $U_{i+1,0,25}$ | ... | $U_{n-1,0,25}$ |
| ⋮ | ⋮ | | ⋮ | ⋮ | | ⋮ |
| $U_{0,0,0}$ | $U_{1,0,0}$ | ... | $U_{i,0,0}$ | $U_{i+1,0,0}$ | ... | $U_{n-1,0,0}$ |
| 0 | 1 | ... | i | i+1 | ... | n−1 |

TRACK NUMBER

APPARATUS FOR PRODUCING A LEGIBLE VIDEO IMAGE DURING HIGH SPEED REPRODUCTION OF A DIGITAL VIDEO SIGNAL

BACKGROUND OF THE INVENTION

1. Field of the Invention

The present invention relates to an apparatus for recording and reproducing a video signal, and, more particularly, to an apparatus which is capable of reproducing a legible video image during a high speed reproduction of a recorded digital video signal.

2. Description of the Related Art

The amount of data to be recorded in an apparatus for recording and reproducing a digital video signal (hereinafter is referred to as a digital VTR) is far more than that in an apparatus for recording and reproducing an analog video signal. Therefore, in the digital VTR, in order to convert the analog video signal to the digital video signal with a conversion efficiency that is as high as possible, data representing a video signal is compressed wiring a high efficiency coding method. The conversion efficiency is defined by a ratio of the amount of analog data to the amount of digital data. The conversion efficiency increases when less digital data is needed to represent a given amount of analog data. The compressed data is recorded on a magnetic tape by the digital VTR.

An example of a high efficiency coding method is described hereafter. In the high efficiency coding method, a video signal of one frame is divided into a plurality of macro blocks composed of data of an area representing eight pixels in the horizontal direction and eight lines in the vertical direction. The macro blocks are shuffled, and subsequently, a known discrete cosine transform operation and a variable length coding operation are applied to the macro blocks so that each macro block is converted into coded data. The conversion efficiency is improved by the shuffling operation.

The coded data of each macro block, includes a main component, which is a low frequency component of an original signal. This main component is stored in one synchronizing block (hereinafter referred to as SYNC block). Prior to recording the SYNC block data formed as mentioned above, on the magnetic tape, the SYNC block data is rearranged by a recording deshuffling circuit. The rearranged SYNC block data are recorded on the video track of the magnetic tape in the rearranged order. As a result of this rearrangement, when the SYNC blocks are reproduced, the macro blocks reproduced from the SYNC blocks, which are neighboring each other on a video track of the magnetic tape, are placed in the immediate neighborhood on a video image.

During a high speed reproduction of the recorded SYNC block data, video data reproduced from the video tracks having the same track number and included in a plurality of frames are placed in the immediate neighborhood on the reproduced video image. The above-mentioned prior art is disclosed in the Japanese published unexamined patent application. Hei 5-252476.

In the above described recording method, the order of the macro blocks arranged by the input shuffling circuit is different from the order of the SYNC block data rearranged by the recording deshuffling circuit. Therefore, the input shuffling circuit and the recording deshuffling circuit must be configurated as separate data rearrangement circuits. Consequently, two kinds of data rearrangement circuits are required thereby complicating the circuit configuration.

OBJECT AND SUMMARY OF THE INVENTION

An object of the present invention is to provide an apparatus for recording and reproducing a digital video signal simplifies the input shuffling circuit for improving the compression efficiency by rearrangement of data and a recording deshuffling circuit for improving the image quality during a high speed reproduction by the rearrangement of data.

The apparatus for recording and reproducing the digital video signal in accordance with the present invention comprises:

input shuffling means for dividing a video image into a first predetermined number of segments in the vertical direction and into a second predetermined number of segments in the horizontal direction in order to divide the video image into super blocks corresponds to the product of the first predetermined number by the second predetermined number, setting a predetermined order of the super blocks, dividing each super block into a plurality of macro blocks comprising data of a third predetermined number of horizontal pixels and a fourth predetermined number of vertical pixels, setting a predetermined order of macro blocks in each super block, setting a video segment comprising plural macro blocks belonging to different super blocks, and arranging the video segment as the unit of data processing;

coding means for generating coded data of which a variable length coding operation is applied to video data to limit the amount of data of the coded data to a predetermined amount of data every video segment, synchronizing block data generation means for generating synchronizing block data to store a main component of the coded data of one macro block in one synchronizing block, recording deshuffling means for rearranging the super blocks of the first arrangement order of super block into a predetermined second arrangement order of super block, recording means for recording the synchronizing block data on plural video tracks of a magnetic tape moving with a first moving speed.

By the above-mentioned configuration, the arrangement of the macro blocks in a super block is decided by the input shuffling means, and the arrangement of the macro blocks in the super block is not changed after the deshuffling operation by the recording deshuffling means. Consequently, the circuit configuration of the recording deshuffling means is simplified.

Moreover, in the decoding means, because a video segment, composed of plural macro blocks separated from each other on a video image, is applied to data compression as a unit of a variable length coding operation, the compression efficiency is improved. Further, in the input shuffling means, the data of each video segment is arranged in the order from the macro blocks which are placed on the central part of the video image to the macro blocks which are placed on a peripheral portion. Thus, the macro blocks of each video segment which are lastly coded by the coding means are placed on the end part of the video image. Therefore, in the case where the total amount of the coded data of each video segment exceeds a predetermined amount and overflows, even if the coded data of the macro blocks which are lastly coded are neglected, the deterioration of the video image due to the neglection of the data does not occur at the central portion but occurs on the peripheral portion of the video image, because the lastly coded macro blocks are placed on the peripheral portion of the video image. Consequently, the video image on the central part is not damaged by the neglect of the data.

Moreover, in the recording deshuffling means and the decoding means, the SYNC block data are rearranged so that the macro blocks corresponding to the SYNC block data are in the neighborhood of each other on the video image, and the coded data, including the main component of the macro blocks, are recorded on the video track of the magnetic tape in the rearranged order. Consequently, during the high speed reproduction, the SYNC block data reproduced from a part of the video tracks having the same track number are placed in the neighborhood of each other on the reproduced video image. Consequently, a legible video image is obtained in the high speed reproduction.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 5(b) is a diagram representing arrangement of the super blocks in the 625/50 system of the present invention;

FIG. 6(a), FIG. 6(b) and FIG. 6(c) are diagrams representing arrangements of macro blocks in a super block in the 525/60 system of the present invention;

FIG. 6(d) is a diagram representing the arrangement of the macro blocks in a super block in the 625/50 system of the present invention;

FIG. 13 is a block diagram representing the relation between the SYNC block data and the video tracks in the present invention;

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
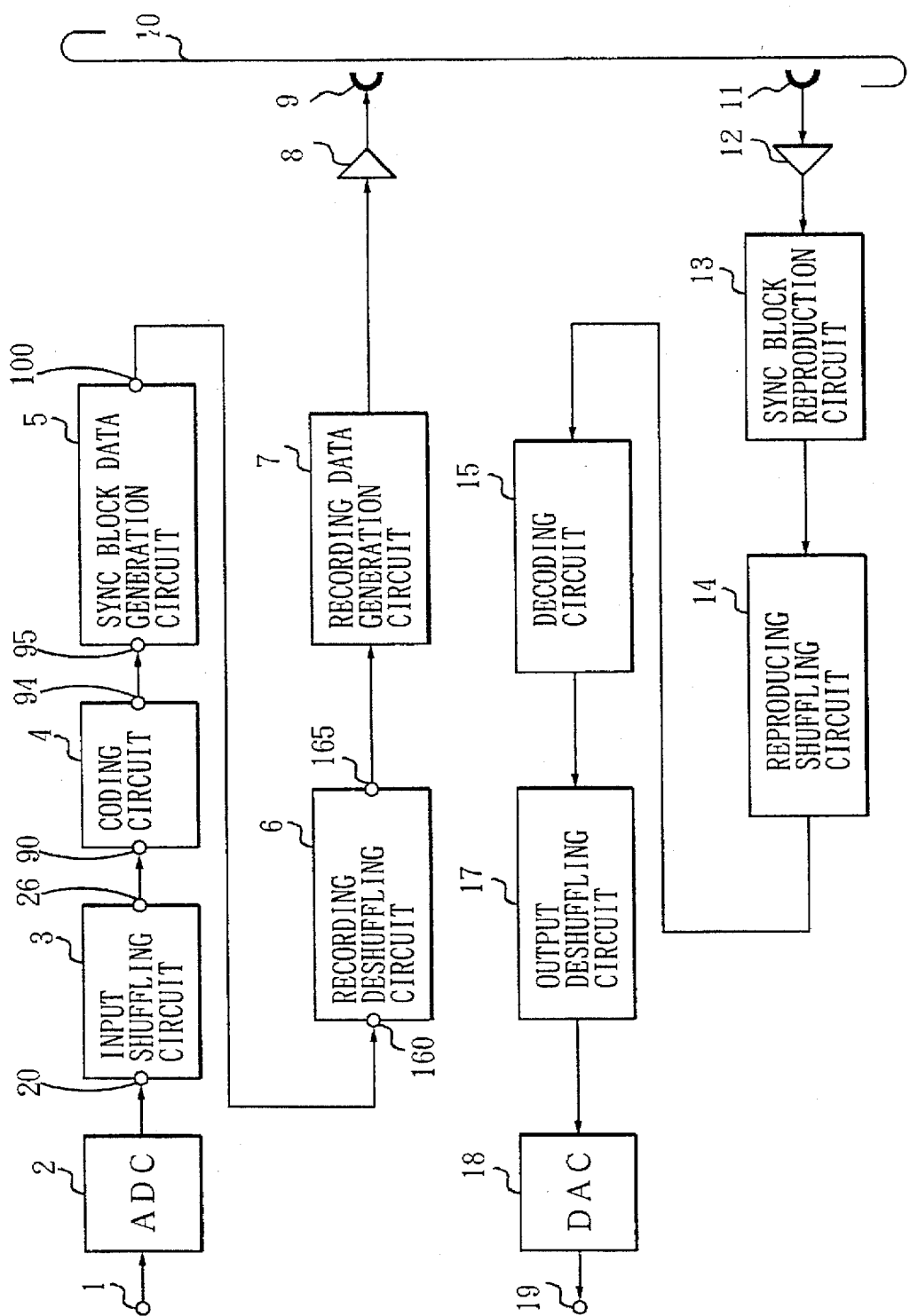
FIG. 1 is a block diagram of an embodiment of an apparatus for recording and reproducing a digital video signal in accordance with the present invention.

FIG. 1 is a block diagram of a circuit in an apparatus for recording and reproducing a digital video signal according to an embodiment of the present invention. Referring to FIG. 1, component signals of an analog video signal are input to an input terminal 1. The circuit is applicable to an NTSC standard video signal (hereinafter is referred to as 525/60 system) of 525 scanning lines per frame and 60 Hz of the field frequency and the PAL standard video signal (hereinafter is referred to as 625/50 system) of 625 scanning lines per frame and 50 Hz of field frequency. First, the case of 525/60 system is described hereafter.

[525/60 system]

Video signals input to the input terminal 1 are component signals comprised of a luminance signal Y, a color difference signal (R - Y) and a color difference signal (B - Y). The component signals are applied to an analog to digital converter 2 (hereinafter is referred to as ADC), and are converted into a digital signal (image data) of the known 4:2:2 format. Effective data of a luminance signal Y per frame comprise the data of the product of 720 pixels of horizontal data by 480 lines of vertical data. Moreover, each effective data of the color difference signals (R - Y) and (B - Y) per frame comprise the data of the product of 360 pixels of horizontal data by 480 lines of vertical data.

Figure 2:
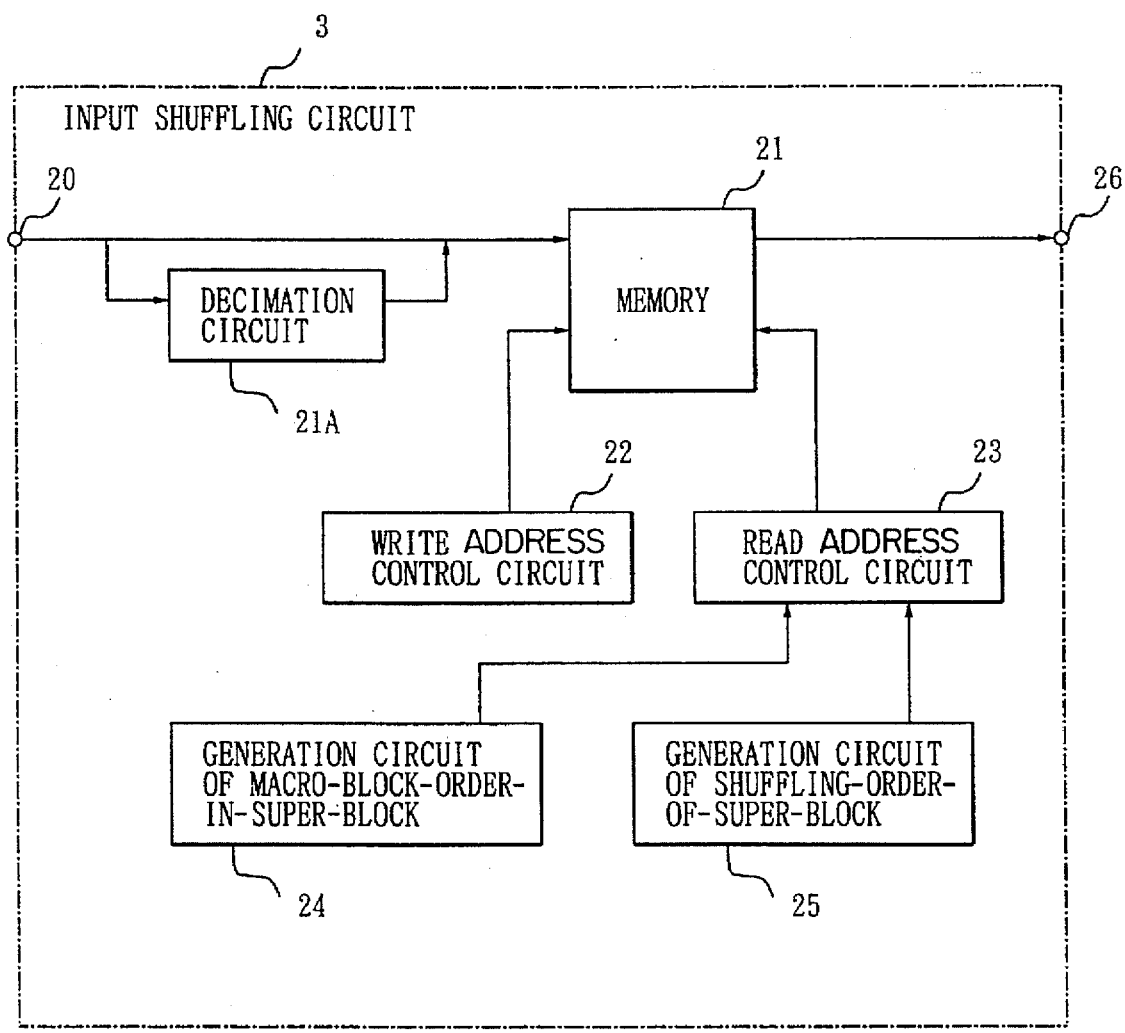
FIG. 2 is a block diagram of the circuitry of an input shuffling circuit included in the block diagram in FIG. 1.

The digital signal in the 4:2:2 format is input to the input shuffling circuit 3, and is converted into a digital signal (video data) of 4:1:1 format by a decimation circuit 21A included in the input shuffling circuit 3 as shown in FIG. 2. In the 4:1:1 format, the effective data of the luminance signal Y per frame comprise the data of the product of 720 pixels of horizontal data and 480 lines of vertical data. Moreover, each effective data of the color difference signals (R - Y) and (B - Y) per frame comprise the data of the product of 180 pixels of horizontal data by 480 lines of vertical data.

The input shuffling circuit 3 comprises a memory 21, a write address control circuit 22, a read address control circuit 23, a macro-block-order-in-super-block generation circuit 24 and a shuffling-order-of-super-block generation circuit 25. See FIG. 2. The video data in the 4:1:1 format output from the decimation circuit 21A are written in the memory 21 by a control signal output from the write address control circuit 22. The written video data is read out from the memory 21 by a control signal output from the read address control circuit 23. The read address control circuit 23 receives signals of the macro-block-order-in-super-block generation circuit 24 and the shuffling-order-of-super-block generation circuit 25. The video data is placed in block form by write and read operations, and the block data is output to a terminal 26.

Figure 3A:
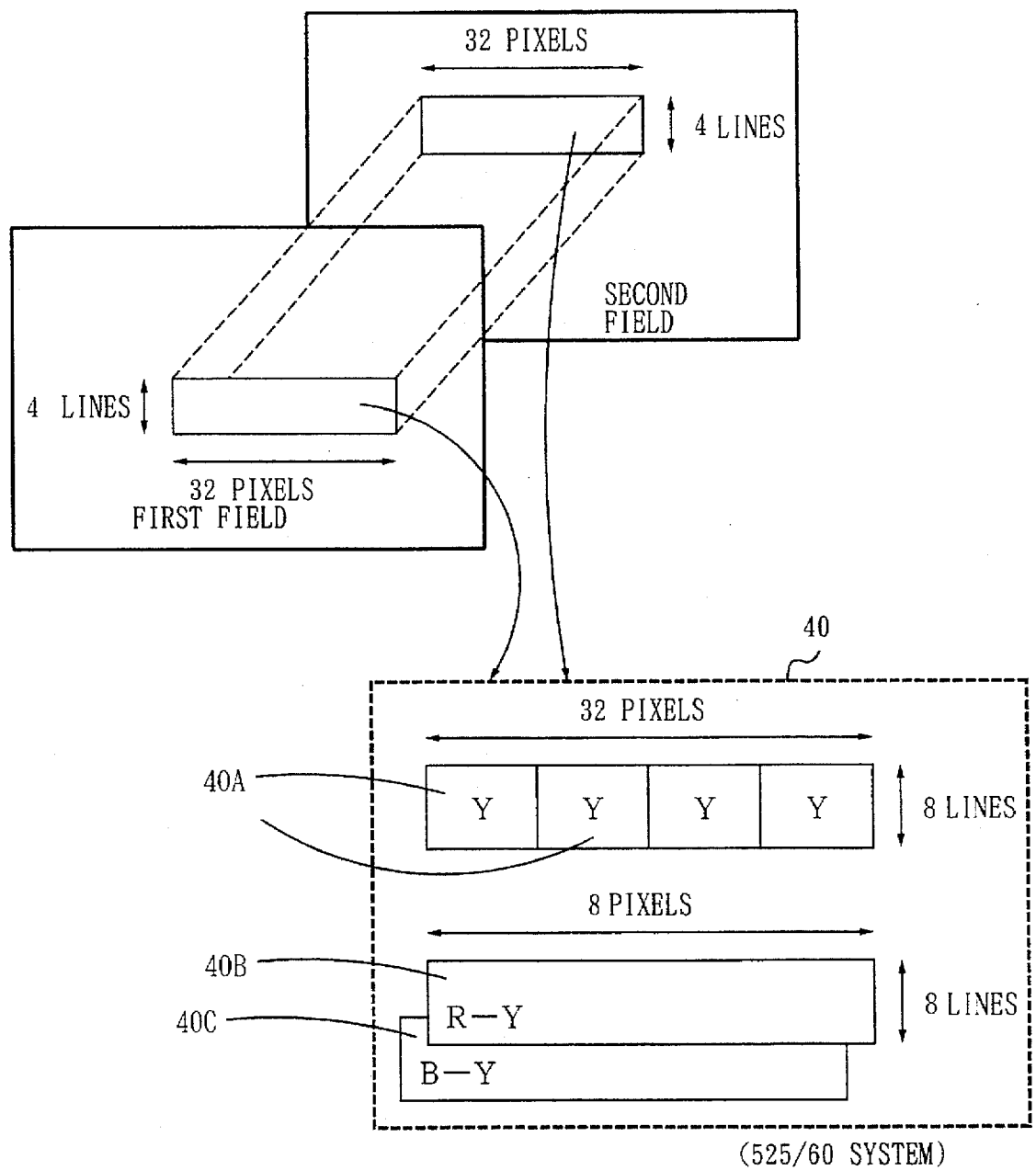
FIG. 3(a) is a diagram of a macro block in the NTSC standard (hereinafter is referred to as 525/60 system) of the embodiment of the apparatus for recording and reproducing the digital video signal in accordance with the present invention.
Figure 4A:
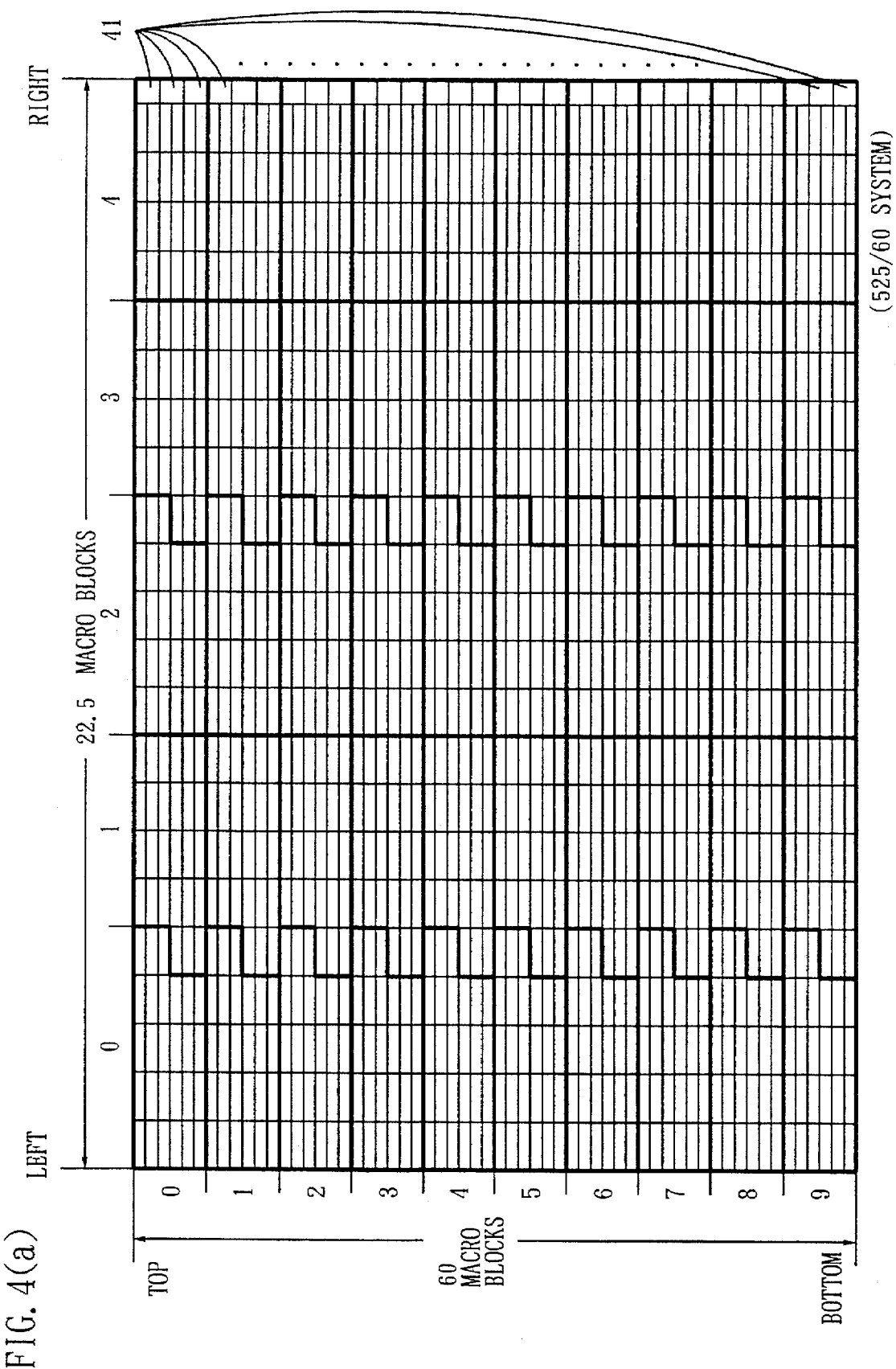
FIG. 4(a) is a diagram representing the macro blocks and super blocks in the 525/60 system of the present invention.

The structure of the block data is shown in FIG. 3(a) and FIG. 4(a). The block data structure of a macro block in the 525/60 system is shown in FIG. 3(a). Referring to FIG. 3(a), a video image of one frame, composed of a first field and a second field, is divided into a plurality of macro blocks 40 which are defined as data processing units. A macro block 40 comprises four DCT blocks (discrete cosine transform) 40A of the luminance signal Y, one DCT block 40B of the color difference signal (R - Y) and one DCT block 40C of the color difference signal (R - Y). One DCT block is composed of the data of the product of eight pixels of horizontal data by four lines of vertical data per field, and the number of data is equal to (8×4×2) per one frame (2 fields). Therefore, as shown in FIG. 4(a), the video image of one frame is divided into 22.5 segments in the horizontal direction between the left end shown by "LEFT" and the right end shown by "RIGHT", and is divided into 60 segments in the vertical direction between the upper end shown by "TOP" and the lower end shown by "BOTTOM". Consequently, the video image of one frame is divided into 1350 macro blocks (22.5×60).

In the macro blocks 41 on the right end portion of the video image, the luminance signal Y is composed of the data of the product of 16 pixels of horizontal data by 8 lines of vertical data per one field and thus, the number of data is (16×8×2) per two fields (one frame). Moreover, the color difference signals (R - Y) and (B - Y) are composed of the data of the product of 4 pixels of horizontal data by 8 lines of vertical data per field and thus, the number of data is (4×8×2) per two fields (one frame).

In the input shuffling circuit 3, the video image of one frame is divided into a plurality of blocks designated as "super blocks". The structure of the block data in the super blocks is illustrated with thick lines in FIG. 4(a). The video image of one frame is divided into 10 segments in the vertical direction and five segments in the horizontal direction, and thus, is divided into 50 super blocks (10×5), for example. Areas separated by thick lines in FIG. 4(a) represent the super blocks.

Figure 5A:
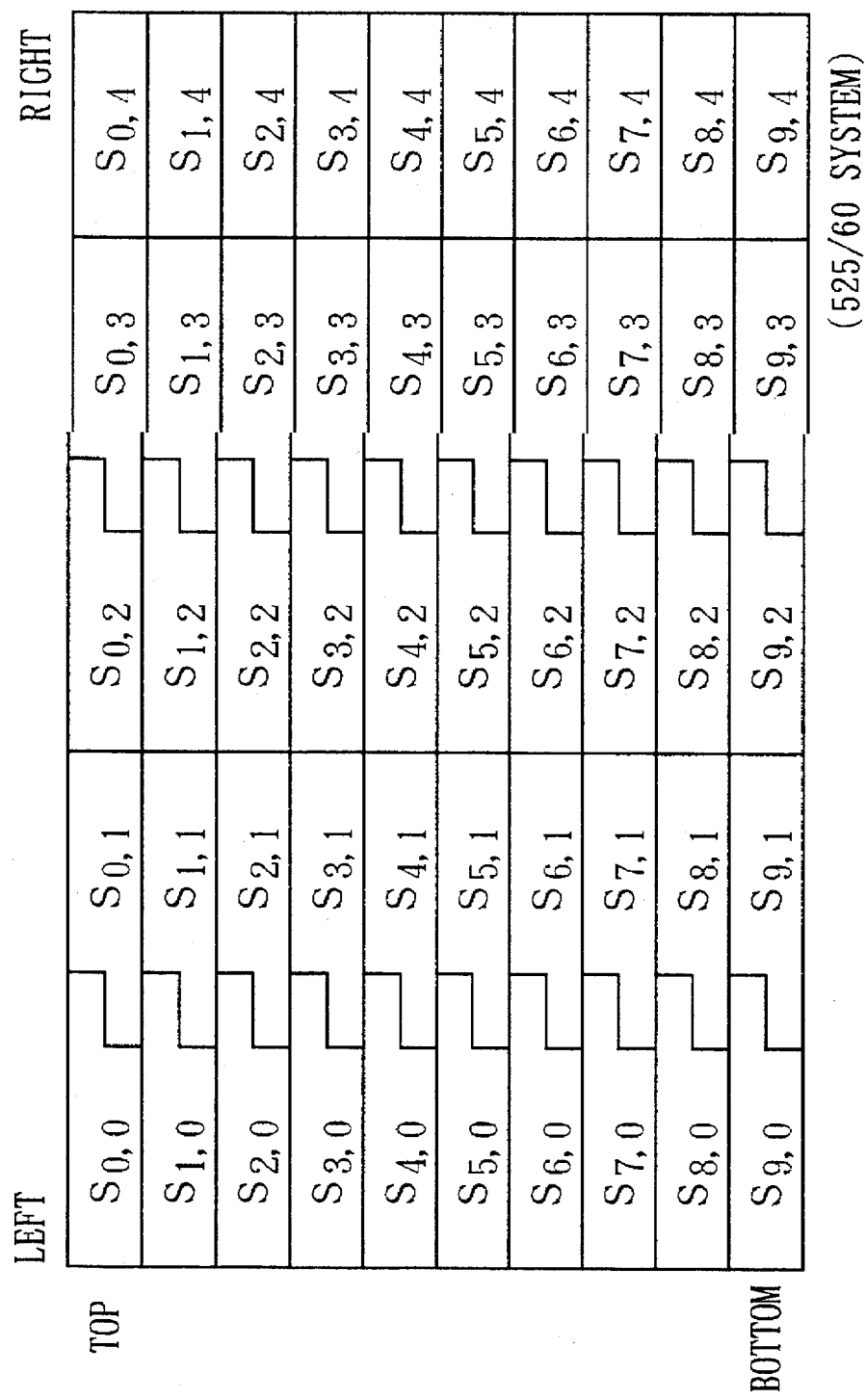
FIG. 5(a) is a diagram representing the arrangement of the super blocks in the 525/60 system of the embodiment.

The arrangement of the super blocks is shown in FIG. 5(a). An address of each super block is represented by "$S_{i,j}$ (i=0, ... ,9; j=0, ... ,4)". One super block $S_{i,j}$ comprises 27 macro blocks. Two horizontally neighboring super blocks $S_{i,0}$ and $S_{i,1}$ are step-shaped at their boundaries in order to equalize the number of macro blocks in each super block. In a similar manner, two horizontally neighboring super blocks $S_{i,2}$ and $S_{i,3}$ are step-shaped at their boundary.

Figures 6A, 6B:
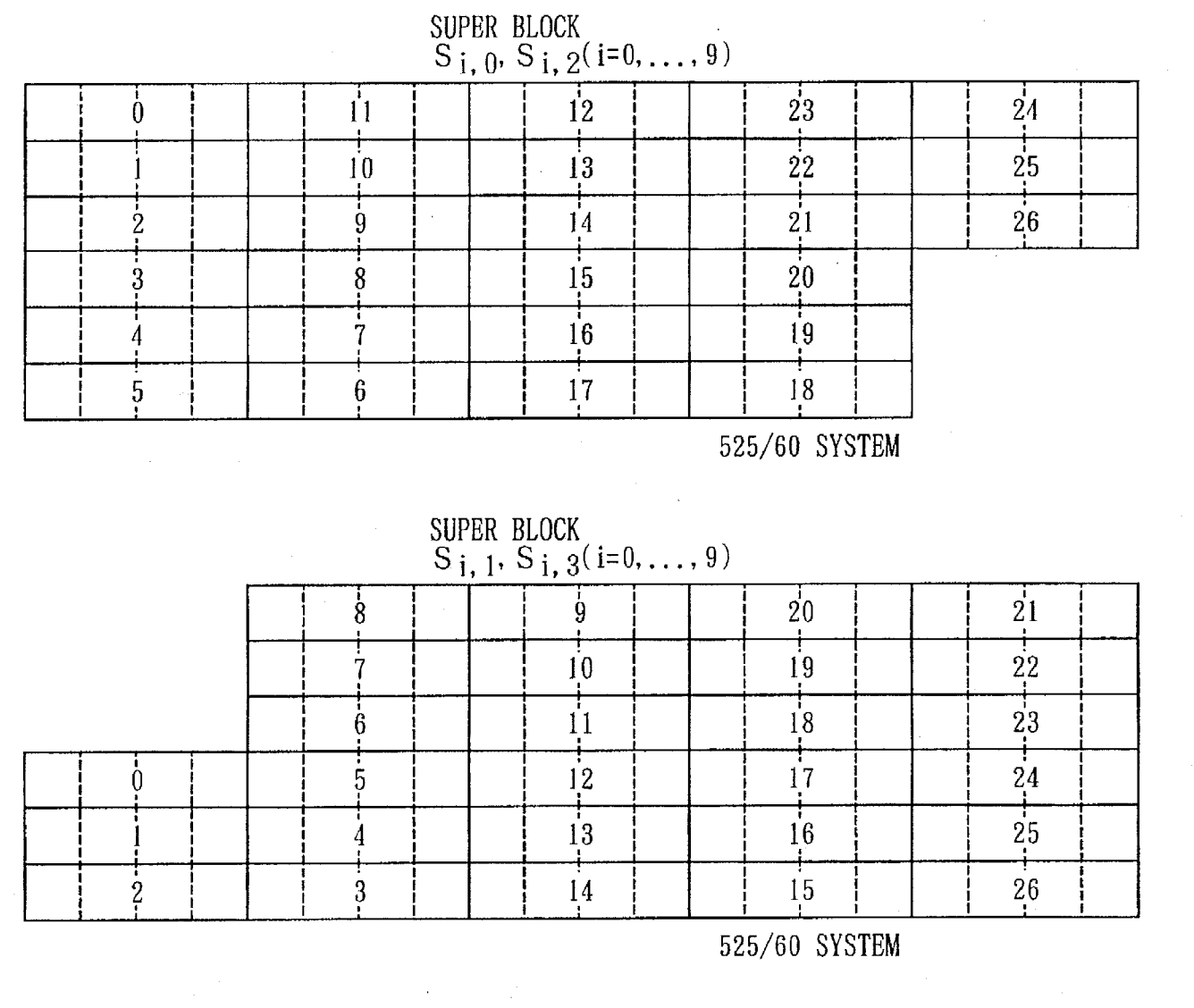

The arrangement of the macro blocks in each super block is shown in FIG. 6(a), FIG. 6(b) and FIG. 6(c). As shown in FIGS. 6(a), 6(b) and 6(c), the arrangements of the macro blocks in the super blocks are classified into three patterns in accordance with the shape of the super block. The super blocks $S_{i,0}$ and $S_{i,2}$ (i=0, ... 0,9) are classified into a first pattern as shown in FIG. 6(a), the super blocks $S_{i,1}$ and $S_{i,3}$ are classified into a second pattern as shown in FIG. 6(b), and the super block $S_{i,4}$ are classified into a third pattern as shown in FIG. 6(c).

In the super blocks of these three patterns, the macro block at the upper left-hand corner of each super block is given a first number and is represented by "0". Subsequently, the macro blocks arranged in the vertical direction with respect to the first macro block are given a series of number in the vertically arranged order. The next number of the final macro block in the vertical direction is given to the macro block neighboring to the final macro block in the horizontal direction. Subsequently, a series of number is given to the macro blocks arranged upward in the vertical direction in the arranged order. The above-mentioned operation is performed to the entire macro blocks in the super block. The resultant arrangement of the macro blocks in the super blocks of three patterns are shown in FIG. 6(a), FIG. 6(b) and FIG. 6(c), respectively. Twenty-seven macro blocks in a super block are represented by "$M_{i,j,k}$ (i=0, ... ,9; j=0, ... ,4; k=0, ... ,26)". The arrangement of the address illustrated in FIG. 6(a), FIG. 6(b) and FIG. 6(c) is performed by the macro-block-order-in-super-block generation circuit 24 in the input shuffling circuit 3.

Subsequently, one macro block is designated in each one of the five super blocks, which are separated from each other on the video image, and one "video segment" is composed of the five macro blocks selected from the separated five super blocks as mentioned above. The video segment is represented by "$V_{i,k}$ (i=0, ... ,9, k=0, ... ,26)", and the macro blocks $M_{i,j,k}$ represented by the following Equation (1) correspond to a video segment $V_{i,k}$.

$$V_{i,k} = \{ M_{(i+2) \bmod 10,\ 2,\ k}, \\ M_{(i+6) \bmod 10,\ 1,\ k}, \\ M_{(i+8) \bmod 10,\ 3,\ k}, \\ M_{(i+0) \bmod 10,\ 0,\ k}, \\ M_{(i+4) \bmod 10,\ 4,\ k} \}, \\ (i=0, \ldots, 9; k=0, \ldots, 26). \quad (1)$$

Referring to Equation (1), a representation "(i+2) mod 10" in a term "I" of subscripts of "M" represents the "modulo operation" for deriving a remainder by dividing the value of (i+2) by 10. The values 2, 6, 8, 0 and 4 in the respective parentheses are arbitrarily selected. Numerals in a term "J" of the subscripts represent the values of "j" for designating the positions of the super blocks in the horizontal direction. These numerals are also arbitrarily selected.

A term "K" of the subscripts represents the macro block number "k". A video segment "$V_{i,k}$" is comprised of five macro blocks having the same number "k" in five super blocks selected as shown by the Equation (1).

In the Equation (1), a super block $S_{i,j}$ and a macro block $M_{i,j,k}$ in the case of "i=1" and "k=1" are shown in Table 1.

TABLE 1

| Super block | Macro block |
| --- | --- |
| $S_{3,2}$ | $M_{3,2,1}$, |
| $S_{7,1}$ | $M_{7,1,1}$, |
| $S_{9,3}$ | $M_{9,3,1}$, |
| $S_{1,0}$ | $M_{1,0,1}$, |
| $S_{5,4}$ | $M_{5,4,1}$, |

In Table 1, addresses of the super blocks (see FIG. 5(a)) are shown in the left column, and the order from the top to the bottom represents a "first arrangement order of super blocks". Namely, the first order of arrangement of the super blocks is designated by the shuffling-order-of-super-block generation circuit 25 as the equation 1. The addresses of the macro blocks in each super block are shown in the right column (the macro blocks having the number (1) in FIG. 6(a), FIG. 6(b) and FIG. 6(c)).

Subsequently, in FIG. (2), the data stored in the memory 21 is read out during every video segment by controlling the shuffling-order-of-super-block generation circuit 25. Because the five macro blocks in each video segment are taken out from different super blocks from each other, these macro blocks are located on separated positions from each other on the video image.

In the term "J" of the subscripts of Equation 1, the order of the numerals "2, 1, 3, 0, 4" designates positions in the horizontal direction on the video image as shown in FIG. 4(a). The numeral "2" represents a central area in the video image. In a similar manner, the numerals "1" and "3" represent both areas neighboring the central area "2", and the numerals "0" and "4" represent both end areas. As shown by Equation 1, the macro block in the central part on the video image is arranged on the top line in Equation 1, and the macro block in the end part on the video image is arranged in the bottom line in Equation 1. In the data processing of the present embodiment, the macro block of the upper line of Equation (1) has priority over the macro block of the lower line, because the macro block in the upper line is located on the important, central part of the video image and the macro block of the lower line is located on the end part of the video image, which is relatively lower in importance. By the above-mentioned selection of the skipped numerals such as 2, 6, 8, 0 and 4, five super blocks located at separated positions may be designated in the horizontal direction and the vertical direction on the video image.

The order of the video segments $V_{i,k}$ output from the input shuffling circuit 3 is as follows.

$$[ \begin{array}{cccc} V_{0,0}, & V_{0,1}, & V_{0,2}, & \ldots, & V_{0,26}, \\ V_{1,0}, & V_{1,1}, & V_{1,2}, & \ldots, & V_{1,26}, \\ \cdot & \cdot & \cdot & & \\ \cdot & \cdot & \cdot & & \\ \cdot & \cdot & \cdot & & \\ V_{9,0}, & V_{9,1}, & V_{9,2}, & \ldots, & V_{9,26}. \end{array} ]$$

In the above-mentioned expression of the order of the video segments, the video segments are output in the order from left to right in each horizontal line by starting from the top line, and are output in the order shown by successive lower lines.

The macro blocks in the video segment are applied to the coding circuit 4 in the order shown in Equation (1) and are encoded in that order. The coded data are output to a terminal 94 of the coding circuit 4. In the coded data of each macro block of the video segment, if the data of the macro block of the top line in Table 1 overflow by exceeding a predetermined data length, the overflowed data are stored in a data area for the macro block of the subsequent lower line in Table 1. In a similar manner, data overflowed in the macro block of the upper line are successively stored in a data area for the macro block of the lower line. Consequently, case if overflowed data can not be stored in the data area for the macro block of the bottom line in Table 1, the overflowed data are abandoned. However, because the macro block at the bottom line contains the image data corresponds to the peripheral parts of the video image, even if the data of the macro block of the bottom line is abandoned, the reproduced video image is deteriorated only on the peripheral parts. Consequently, damage in the quality of the reproduced image is relatively low.

Figure 7:
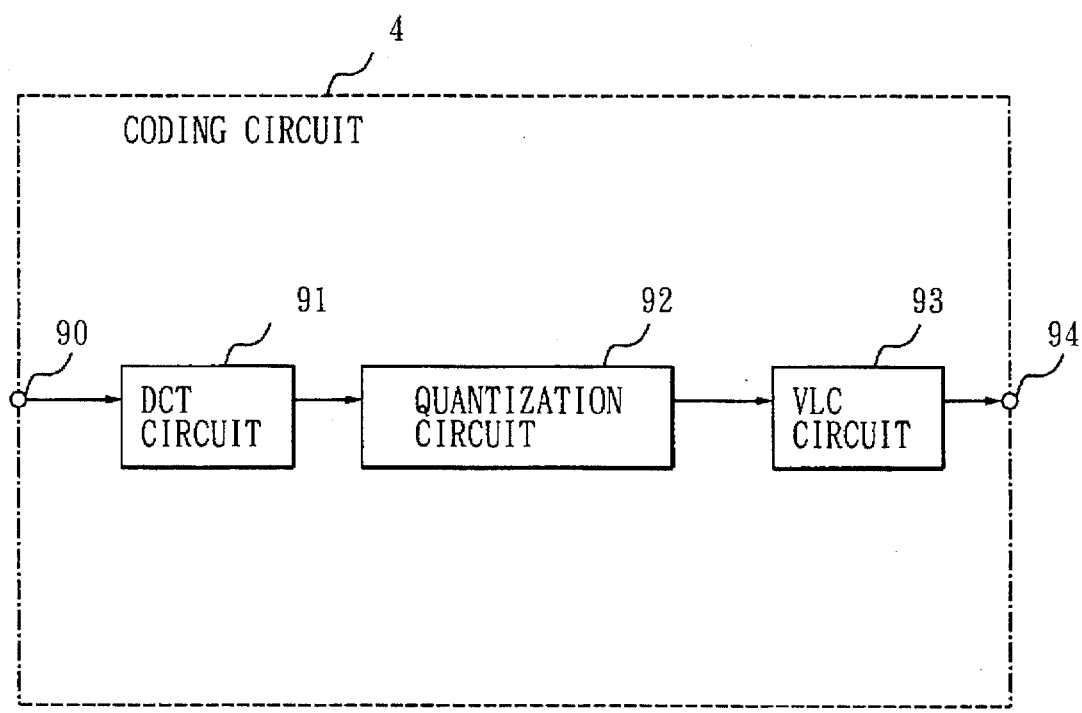
FIG. 7 is a block diagram of a configuration of a coding circuit included in the block diagram of FIG. 1.

A detailed configuration of the coding circuit 4 is shown in FIG. 7. The coding circuit 4 comprises a DCT circuit 91, a quantization circuit 92 and a VLC circuit 93 (variable length coding circuit). The block data of a macro block input to a terminal 90 is discrete-cosine transformed by the DCT circuit 91 in a manner that is well known in the art. Subsequently, an estimation of a data amount of coded data is performed in the quantization circuit 92 so that the coded data of each video sequent is shorter than a predetermined data length, and the coded data is quantized with reference to the estimated amount. The quantized data is input to the VLC circuit 93, and is encoded such that the code length of each video segment is shorter than the predetermined data length. The coded data is output to the terminal 94 and is applied to a synchronizing block data generation circuit 5 (hereinafter is referred to as SYNC block data generation circuit).

Figure 9:
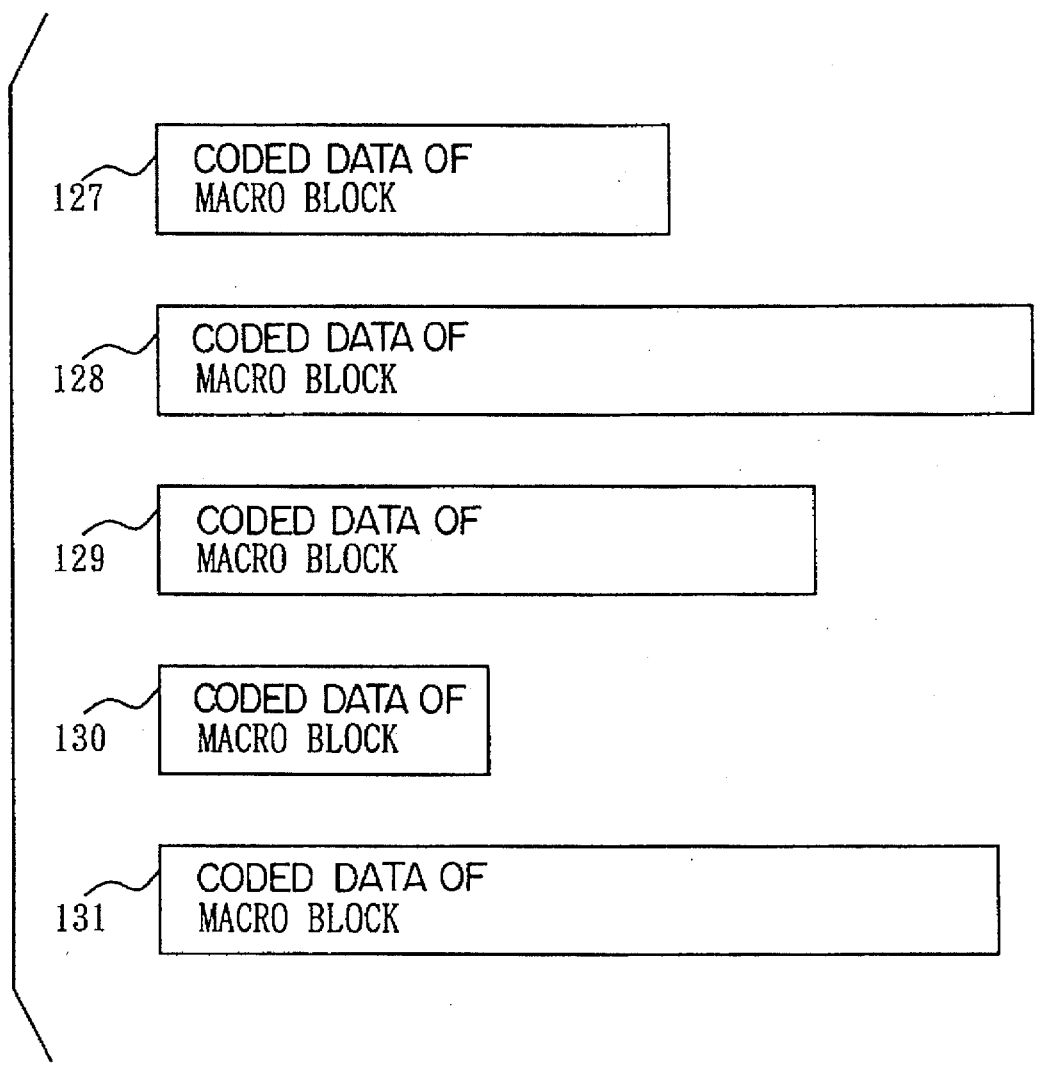
FIG. 9 is a diagram representing the coded data of one video segment in the present invention.

The coded data of one video segment are shown in FIG. 9. The coded data 127, 128, 129, 130 and 131 of each of five macro blocks are different from each other in the data length corresponding to the respective video images. However, the total of the coded data of five macro blocks is limited to the predetermined data length.

Figure 8:
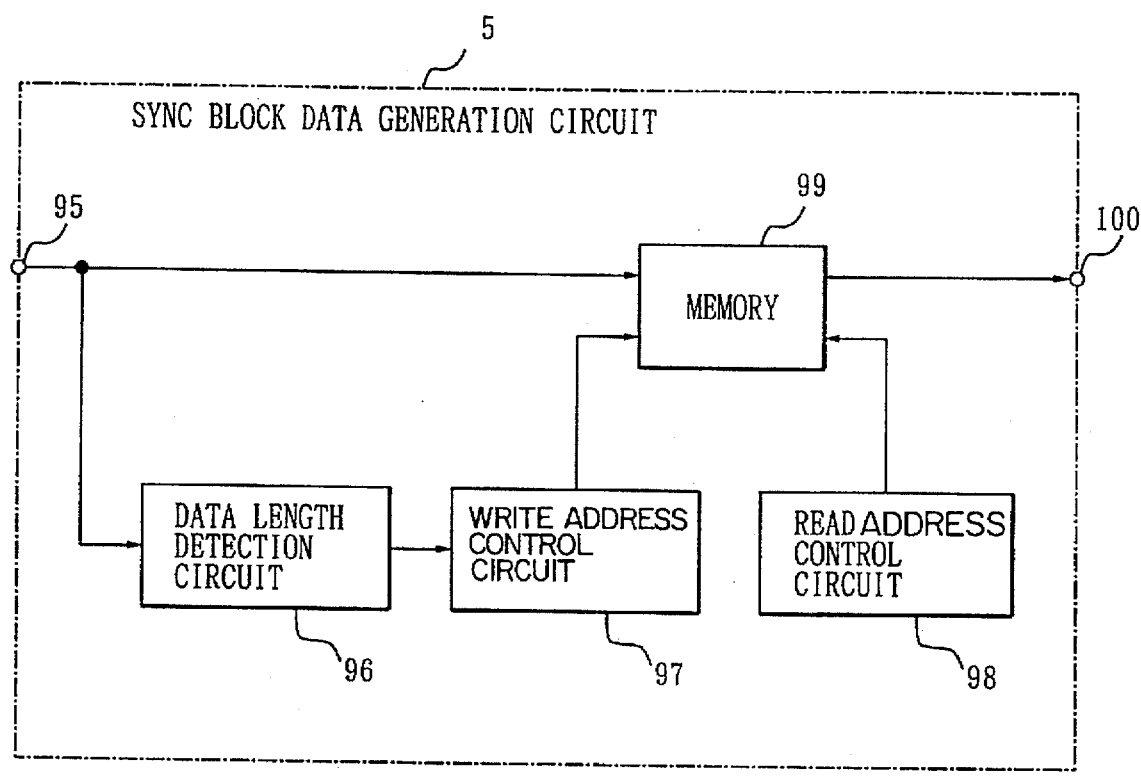
FIG. 8 is a block diagram of a configuration of a SYNC block data generation circuit included in the block diagram of FIG. 1.

As shown in FIG. 8, the SYNC block data generation circuit 5 comprises a data length detection circuit 96, a write address control circuit 97, a memory 99 and a read address control circuit 98.

Figure 10:
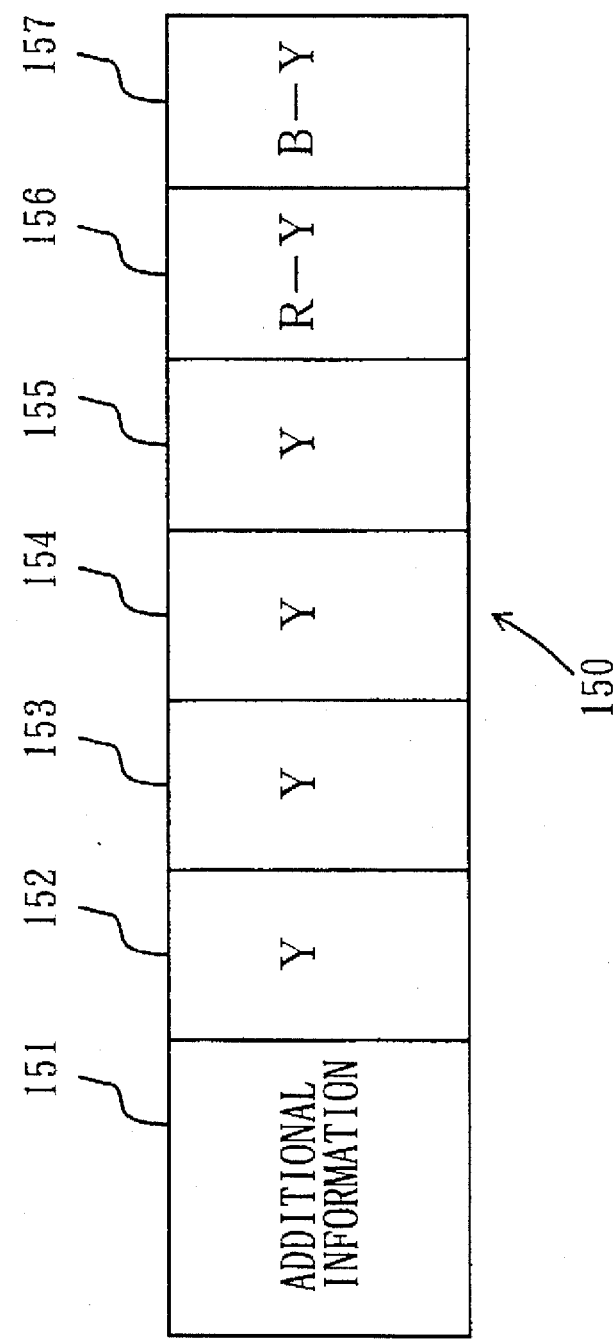
FIG. 10 is a diagram representing the configuration of SYNC block data in the present invention.

FIG. 10 is a diagram representing configuration of the SYNC block data. Referring to FIG. 10. The SYNC block data 150 comprises the coded data of an additional information 151, image data 152, 153, 154, 155, 156 and 157 of the luminance signal and the color difference signals. The additional information data 151 represents a condition of data compression. The data length of the image data 152–157 are set to a predetermined length, and a memory space corresponding to the predetermined data length is prepared in the memory 99 of the SYNC block data generation circuit 5 of FIG. 8.

In the SYNC block data generation circuit 5, the data lengths of the input image data 152–157 are detected by the data length detection circuit 96. Subsequently, the image data 152–157 are written in the memory 99 based on the output signal of the write address control circuit 97. During the write operation, the coded data of five macro blocks are incorporated in respective data areas of the five SYNC block data 150.

The five SYNC block data 150 are generated by the following process. The coded data of the DCT block of one luminance signal is incorporated in the data area of the video data 152 such that the low frequency components of the luminance signal are incorporated with priority. In a similar manner, the coded data of the DCT blocks of luminance signals of three macro blocks are incorporated in the respective data areas of the video data 153, 154 and 155 such that the low frequency components of the respective luminance signals are incorporated with priority. In a similar manner, the coded data of the DCT blocks of the color difference signals (R - Y) and (B - Y) are incorporated in the data areas of the video data 156 and 157 with priority on the low frequency components.

In the memory areas prepared for the image data 152–157 in the memory 99, a memory area is filled with the coded data and a part of the coded data is allowed to overflow. On the other hand, a memory area has a margin. In the case that coded data overflows in the memory area of an image data, the overflowed coded data are written in the memory area of video data having the margin in the memory areas of the same SYNC block data. The low frequency component of the signal is called a "main component". In the case that the coded data overflows in spite of the above-mentioned operation, the overflowed part of the coded data is written in the memory areas of the video data having a margin in other four SYNC block data.

Compression information is written in the memory area of the additional information 151. In this manner, the main component of the coded data of one macro block is stored in the data area of one SYNC block data. Consequently, one SYNC block data 150 corresponds to one macro block data. A SYNC block data is represented by "$U_{i,j,k}$". One SYNC block data $U_{i,j,k}$ comprises the main component of the coded data of one macro block $M_{i,j,k}$.

Figure 11:
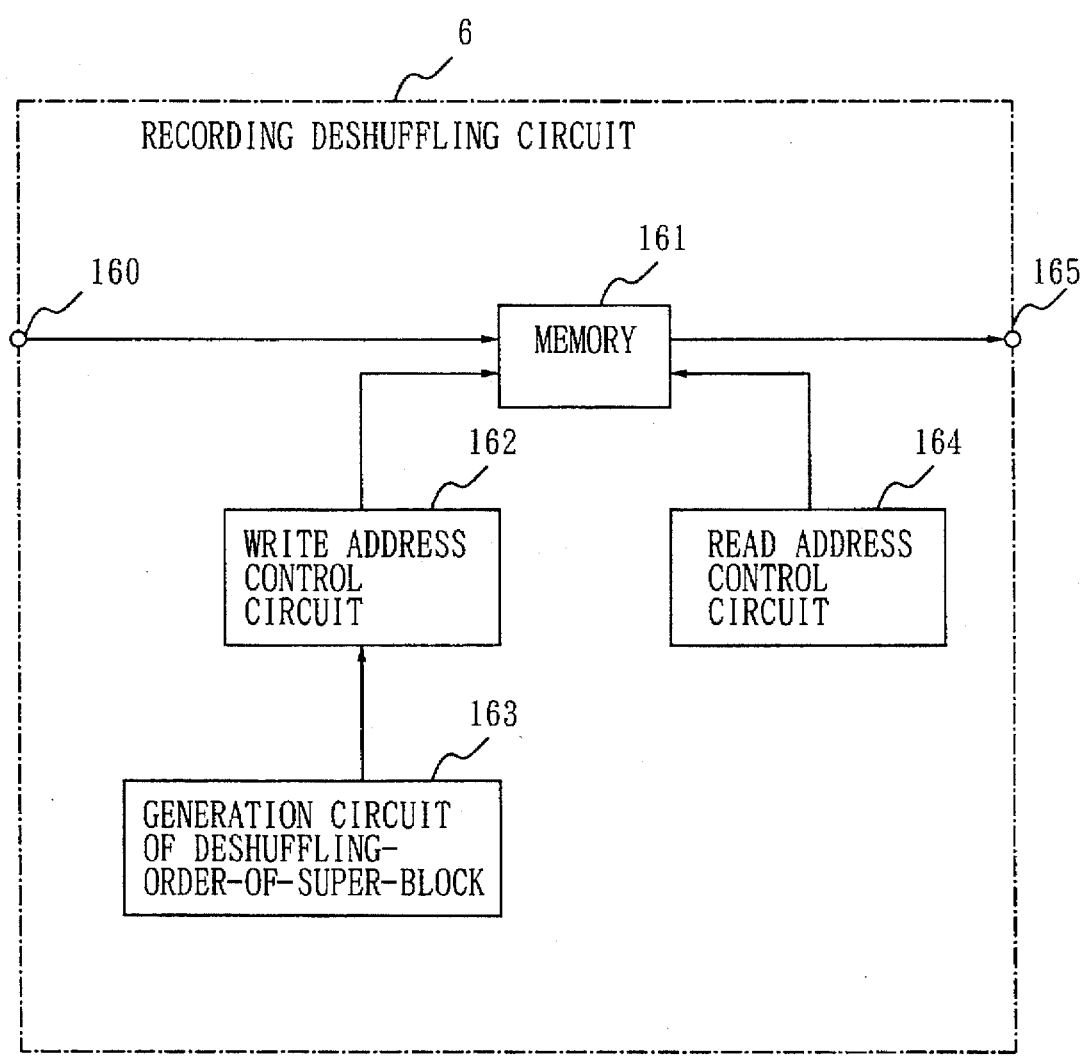
FIG. 11 is a block diagram of the configuration of a recording deshuffling circuit included in the block diagram of FIG. 1.

The SYNC block data 150 stored in the memory 99 by the above-mentioned operation is read out by the read address control circuit 98, and is applied to a recording deshuffling circuit 6 through a terminal 180. The recording deshuffling circuit 6, as shown in FIG. 11, comprises a memory 161, a write address control circuit 162, a deshuffling-order-of-super-block generation circuit 163 and a read address control circuit 164.

The input SYNC block data 150 is written in the memory 161 by the control signal of the write address control circuit 162. In the memory area of the memory 161, addresses of the memory 161 are set in a manner such that the SYNC block data 150 are arranged in the order of data $T_i$ as shown by Equation (2).

$$T_i = \{ \ U_{i,0,0}, \ \ldots, \ U_{i,0,26},$$
$$U_{i,1,0}, \ \ldots, \ U_{i,1,26},$$
$$U_{i,2,0}, \ \ldots, \ U_{i,2,26},$$
$$U_{i,3,0}, \ \ldots, \ U_{i,3,26},$$
$$U_{i,4,0}, \ \ldots, \ U_{i,4,26} \ \},$$
$$(i = 0, \ldots, 9).$$

The addresses corresponding to the SYNC block data are set by the deshuffling-order-of-super-block generation circuit 163, and the SYNC block data are written in the memory 161 in compliance with the respective addresses. In the memory 161, as mentioned above, only the order of the super blocks are rearranged to a "second arrangement order of super blocks" as shown by Equation (2) in the state that the arrangement of the macro blocks in the super block is maintained.

The SYNC block data 150 stored in the memory 161 are successively read out by control of the read address control circuit 164, and are applied to the recording data generation circuit 7 through a terminal 165.

Figure 12:
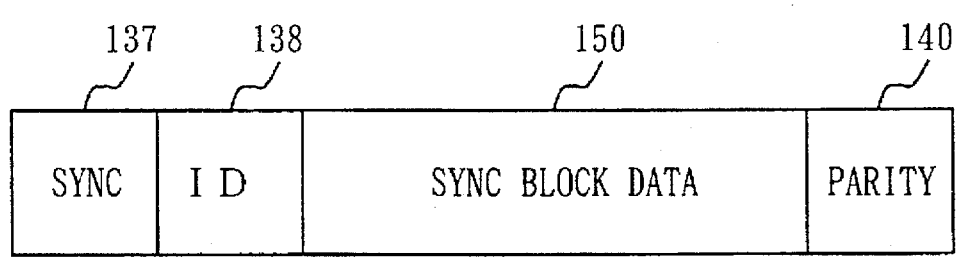
FIG. 12 is a diagram representing a SYNC block in the present invention.

In the recording data generation circuit 7, a predetermined error correction code (parity) 140, identification information (ID) 138 and a predetermined SYNC pattern 137 are added to each SYNC block data 150, and a SYNC block is formed. See FIG. 12. The SYNC block is recorded in a magnetic tape 10 through a recording amplifier 8 and a recording head 9. The structure of the SYNC block is shown in FIG. 12.

The relationship between a SYNC block data $U_{i,j,k}$ and a position to be recorded on the video track is shown in FIG. 13. Referring to FIG. 13, the SYNC block data $U_{0,0,0} \ldots U_{0,4,26}$ are recorded in the video track having a track number "0". In a similar manner, the SYNC block data $U_{i,0,0} \ldots U_{i,4,26}$ are recorded in the video track having the track number "i". The number of tracks for recording the SYNC block data of one frame is ten in the 525/60 system.

Figure 14A:
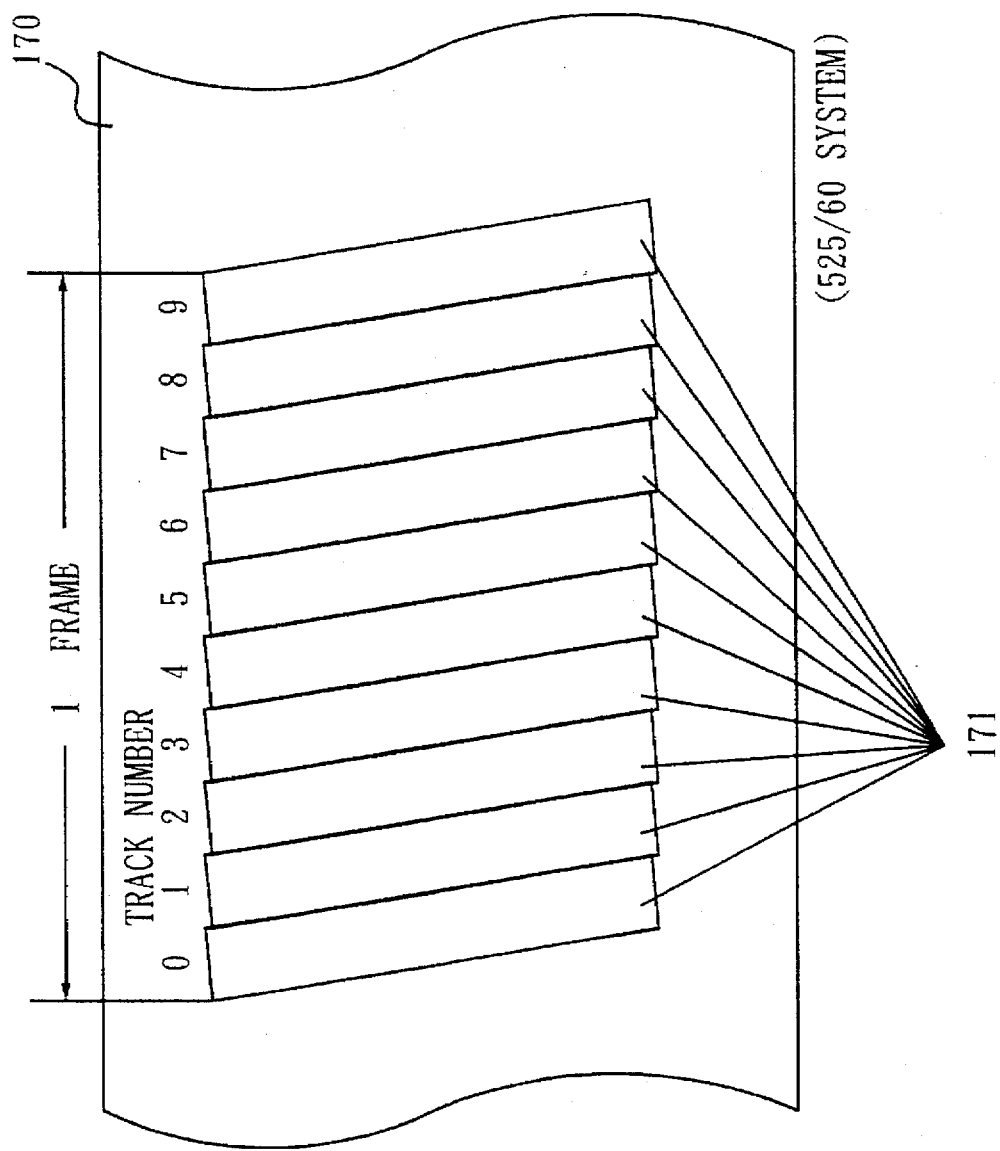
FIG. 14(a) is a diagram representing video tracks on a magnetic tape on which video data of one frame are recorded in 525/60 system in the present invention.

FIG. 14(a) is a diagram illustrating ten tracks 171 formed on the magnetic tape 170 in the 525/60 system. In FIG. 14(a), the SYNC block data containing the main components of the coded data of five super blocks are recorded on one of video tracks 171.

[626/50 system]

If the standard video signal of the 625/50 system is input to the input terminal 1 of the apparatus shown in FIG. 1, in a manner similar to the 525/60 system, the component signals comprising the luminance signal Y and the color difference signals (R - Y) and (B - Y) are input to the ADC 2, and are converted into the digital signal (image data) of the known 4:2:2 format. In the 626/50 system, the effective data of the luminance signal Y of one frame comprise the data of the product of 720 pixels of horizontal data by 576 lines of vertical data. Moreover, the effective data of color difference signals (R - Y) and (B - Y) of one frame comprises the data of the product of 360 pixels of horizontal data by 576 lines of vertical data.

The digital signal of the 4:2:2 format is input in the input shuffling circuit 3, and is converted into the digital signal of 4:2:0 format by the decimation circuit 21A of the input shuffling circuit 3.

In the input shuffling circuit 3 shown in FIG. 2, the digital signal of the 4:2:0 format is written in the memory 21, and is read out from the memory 21 in the predetermined order. The video data of the digital signal is placed in block data form by the write and read operation, and the block data is output to the terminal 26.

Figure 3B:
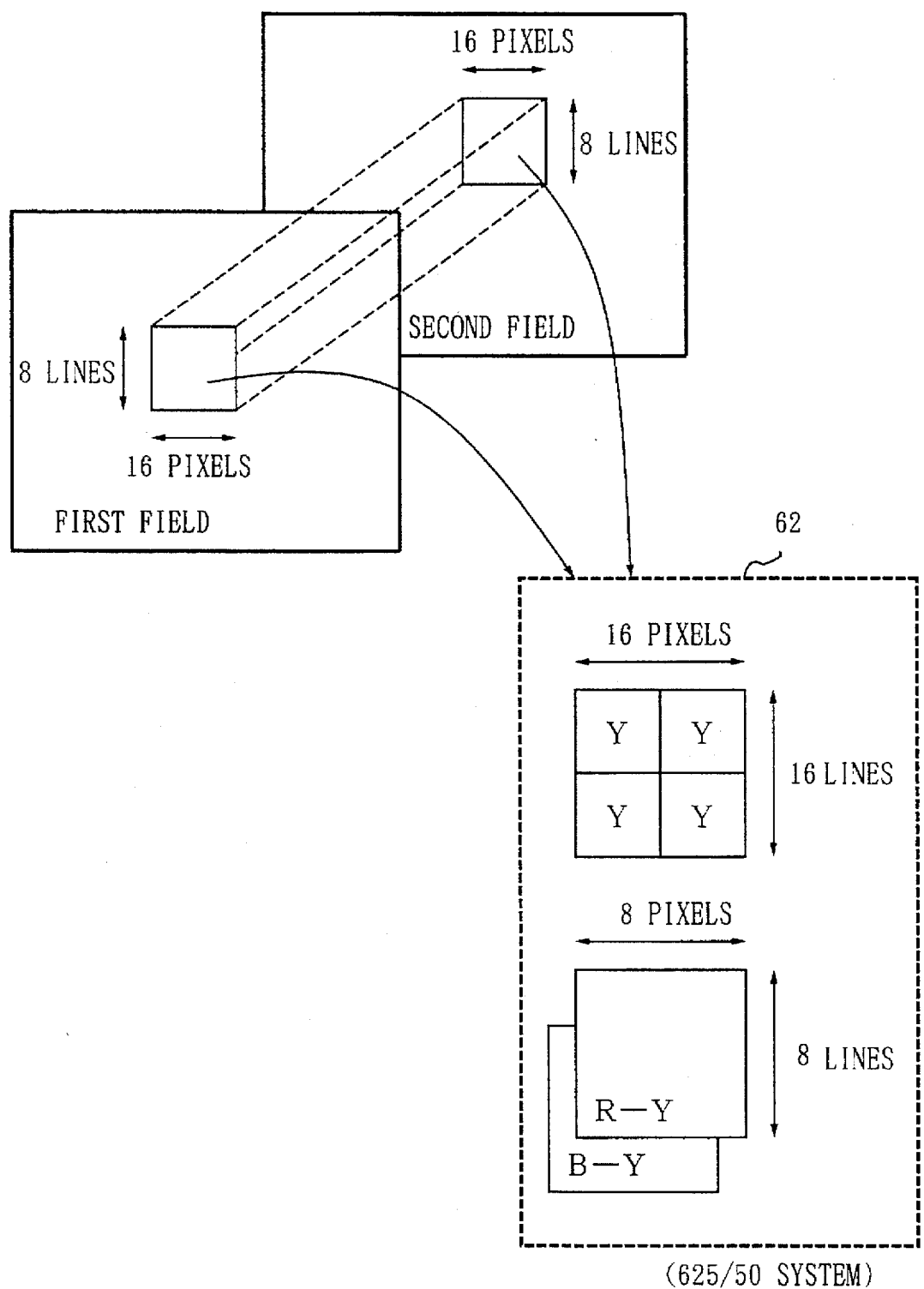
FIG. 3(b) is a diagram of a macro block in the PAL standard (hereinafter is referred to as 625/50 system) of the embodiment of the apparatus for recording and reproducing the digital video signal in accordance with the present invention.

The configuration of the block data is shown in FIG. 3(b). Referring to FIG. 3(b), a macro block 62 comprises four DCT blocks of the luminance signal Y, one DCT block of the color difference signal (R - Y) and one DCT block of the color difference signal (R - Y).

Figure 4B:
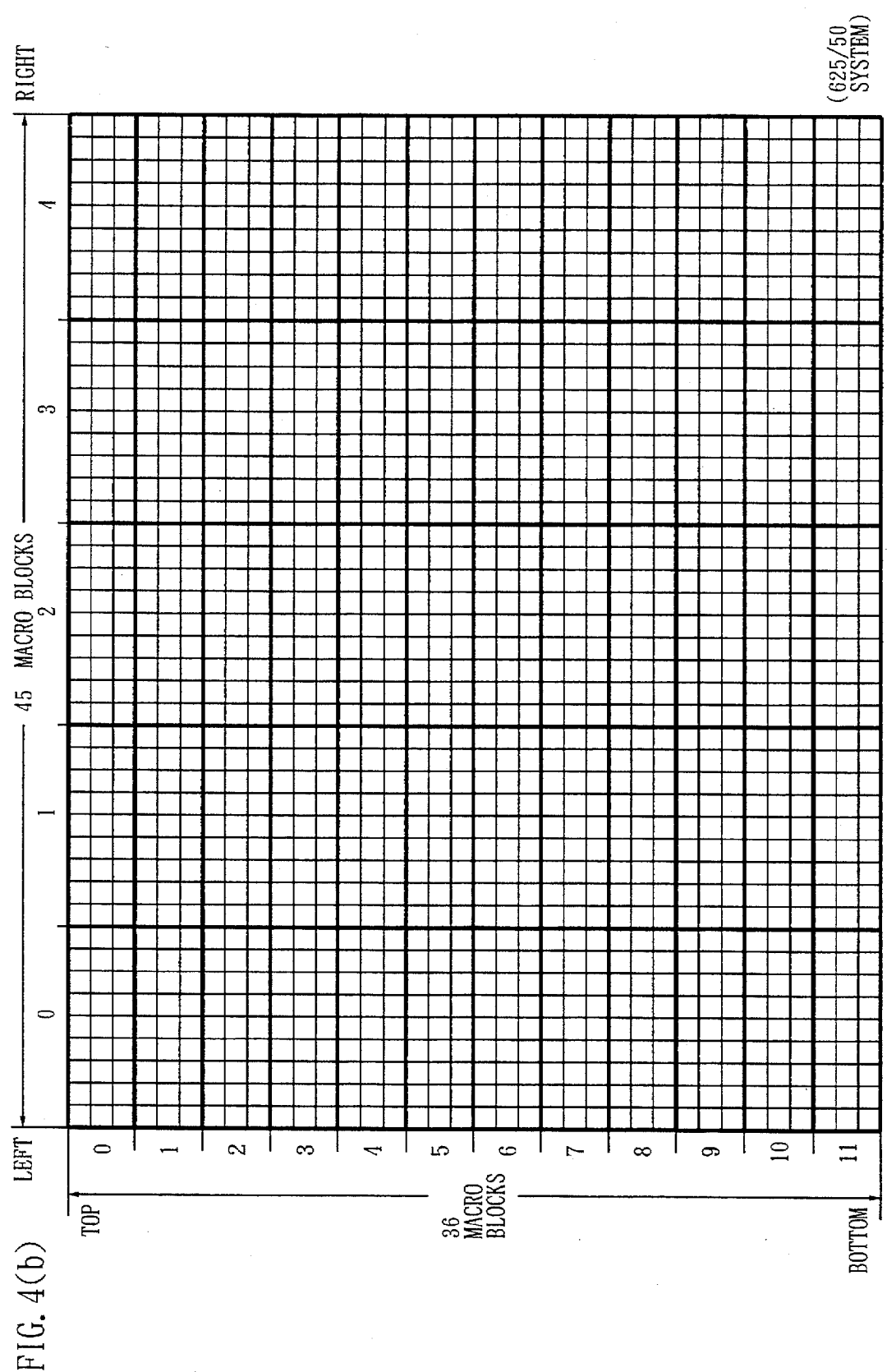
FIG. 4(b) is a diagram representing the macro blocks and super blocks in the 625/50 system in the present invention.

The video image of one frame is divided into five segments in the horizontal direction and is divided into twelve segments in the vertical direction as shown by thick lines in FIG. 4(b). As a result of the division, 60 super blocks (5×12) are formed. Each super block is divided into nine segments in the horizontal direction, divided into three segments in the vertical direction and is divided into 27 macro blocks (9×3). Consequently, the video image of one frame is divided into 45 segments in the horizontal direction and is divided into 36 segments in the vertical direction. Namely, the video image of one frame comprises 1620 macro blocks (45×26).

The arrangement of the super blocks is shown in FIG. 5(b). Each super block is represented by "$S_{i,j}$ (i=0, 1, 2, .. , 10, 11; j=0, 1, 2, 3, 4)". Each super block $S_{i,j}$ is composed of 27 macro blocks numbered as shown in FIG. 6(d). The arrangement of the address illustrated in FIG. 6(a), FIG. 6(b) and FIG. 6(c) is performed by the macro-block-order-in-super-block generation circuit 24 in the input shuffling circuit 3. The arrangement of the macro blocks in the super block is similar to that in the 625/50 system. In the 525/60 system, the arrangement of the macro blocks in the super block has only one pattern, as shown in FIG. 6(d). One video segment is composed of five macro blocks in the same manner as the 525/60 system. When a macro block in the super block is represented by $M_{i,j,k}$ and the video segment is represented by $V_{i,k}$, five macro blocks $M_{i,j,k}$ represented by Equation 3 correspond to a video segment $V_{i,k}$.

$$V_{i,k} = \{ \ M_{(i+2) \bmod 12, 2, k},$$
$$M_{(i+6) \bmod 12, 1, k},$$
$$M_{(i+8) \bmod 12, 3, k},$$
$$M_{(i+10) \bmod 12, 0, k},$$
$$M_{(i+4) \bmod 12, 4, k} \ \},$$
$$(i = 0, \ldots, 11; K = 0, \ldots, 26).$$

In the input shuffling circuit 3 of FIG. 2, the data stored in the memory 21 are arranged as the unit of the video segment by the generation circuit of shuffling-order-of-super-block 25. The five macro blocks in each video segment are located on separate positions from each other on the video image in a manner similar to the 525/60 system.

The macro blocks of each video segment are applied to the coding circuit 4 in the order shown by Equation (3). In the coding circuit 4 and the SYNC block data generation circuit 5, similar processing operation to the 525/60 system is applied to the data, and generated SYNC block data are applied to the recording deshuffling circuit 6.

In the recording deshuffling circuit 6 of FIG. 11, the SYNC block data input from the terminal 160 are written in the memory 161 by the control signal of the write address control circuit 162. The address of the memory area of the memory 161 is set so that the SYNC block data are arranged in the order of data $T_i$ shown by Equation (4).

$$T_i = \{ \ U_{i,0,0}, \ \ldots, \ U_{i,0,26},$$
$$U_{i,1,0}, \ \ldots, \ U_{i,1,26},$$
$$U_{i,2,0}, \ \ldots, \ U_{i,2,26},$$
$$U_{i,3,0}, \ \ldots, \ U_{i,3,26},$$
$$U_{i,4,0}, \ \ldots, \ U_{i,4,26}, \ \},$$
$$(i = 0, \ldots, 11).$$

The addresses corresponding to the SYNC block data are set by the generation circuit of deshuffling-order-of-super-block 163, and the SYNC block data are written in the memory 161 in compliance with the respective addresses. As mentioned above, similarly to the 525/60 system, only the order of the super blocks is rearranged in the state that the order of the macro blocks is maintained in the super block.

The SYNC block data stored in the memory 161 are read out in the order controlled by the read address control circuit 164 and are applied to the recording data generation circuit 7 of FIG. 1 through the terminal 165. In the recording data generation circuit 7, as shown in FIG. 12, a predetermined error correction code (parity) 140, identification information (ID) 138 and a SYNC pattern 137 are added to each SYNC block data, which is recorded in the magnetic tape through the recording amplifier 8 and the recording head 9.

Figure 14B:
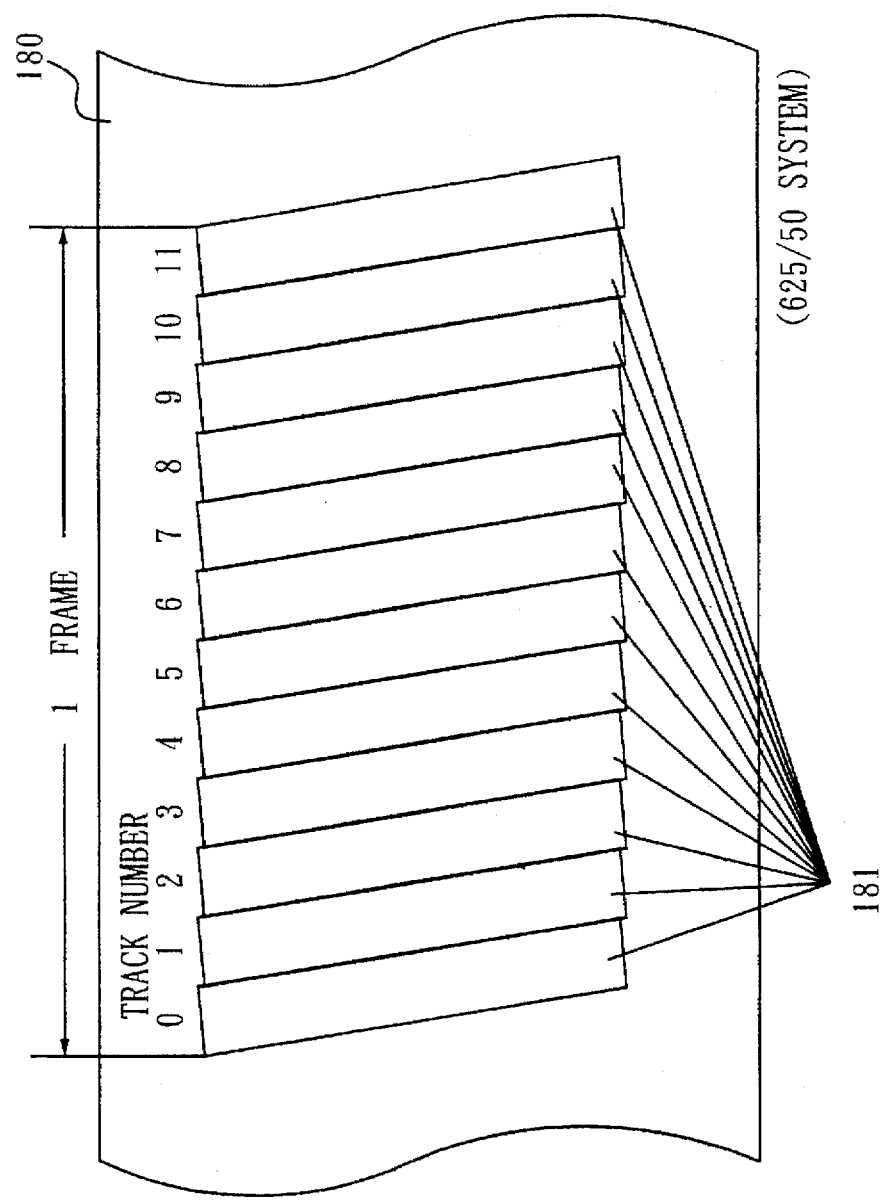
FIG. 14(b) is a diagram representing the video tracks on a magnetic tape on which video data of one frame are recorded in the 625/50 system in the present invention.

The relation between the SYNC block data and the recording positions on the video track is represented by FIG. 13 in the same manner as the 525/60 system. The tracks in which the video data of one frame are recorded are shown in FIG. 14(b). The SYNC block data having the main components of the coded data of five super blocks are recorded on one of video tracks 181.

[Normal speed reproduction]

The reproducing operation of the recorded video data at a normal tape-moving-speed is elucidated hereafter (i.e., a reproducing operation wherein the tape moving speed is the same as the tape moving speed in the recording operation). In FIG. 1, data reproduced by a reproducing head 11 is applied to a SYNC block reproduction circuit 13 through a reproduction amplifier 12. In the SYNC block reproduction circuit 13, the SYNC pattern 137 and ID 138 shown in FIG. 12 are detected, and the SYNC block data is identified. Subsequently, a known error correction operation is applied to the SYNC block data. The corrected SYNC block data are applied to a reproducing shuffling circuit 14.

In the reproducing shuffling circuit 14, a video segment is taken as the unit in data processing. The SYNC block data of each video segment are applied to a decoding circuit 15 and are decoded. The decoded block data are applied to an output deshuffling circuit 17 and are rearranged in the order of the video data on the video image. The video data are converted to an analog video signal by a DAC 18 and are output to a terminal 19.

[High speed reproduction]

When the recorded data of the video image in the 525/60 system or the 625/50 system is reproduced at a higher tape moving speed than that in the recording operation, the reproducing head 11 traverses plural tracks during one-scanning operation, and the SYNC block data of plural frames are detected. The detected SYNC block data are applied to the SYNC block reproduction circuit 13. In the SYNC block reproduction circuit 13, error correction operation is carried out. The error corrected SYNC block data is applied to the reproducing shuffling circuit 14. In the reproducing shuffling circuit 14, the SYNC block data is stored in a predetermined address of a memory in the reproducing shuffling circuit 14 on the basis of the SYNC block ID 138 in FIG. 12. The memory comprises a memory area for storing the SYNC block data of one frame. The SYNC block data stored in the memory is read out in the unit of video segment, and the read out SYNC block data is applied to the decoding circuit 15.

The macro block corresponding to the SYNC block including only the main component of the SYNC block data is decoded by the decoding circuit 15. The data of the decoded macro blocks are applied to the output deshuffling circuit 17 and are rearranged therein, and reproduced video data of one frame are generated. The reproduced video data are converted into an analog signal by the DAC 18 and are output to the output terminal 19. The data of plural frames reproduced from the magnetic tape 10 are mixed in the output video image, and the video data reproduced from the video tracks having the same track number are in the neighborhood of each other. Therefore, the video image of the high speed reproduction is legible.

According to the embodiment, the recording deshuffling circuit rearranges the input block data in the second arrangement order of super block as expressed by Equations (2) and (4), and a successive operation is performed in the second arrangement order of super block. Therefore, the arrangement of the macro blocks in the super block is not changed, and the arrangement operation with respect to the macro blocks is not needed. Consequently, the circuit configuration of the recording deshuffling circuit is simplified.

The method for dividing the video image into the super blocks and the macro blocks is not limited to the method shown in FIGS. 4(a) and 4(b). Moreover, the number of macro block of the video segment may be arbitrarily selected. Furthermore, the number of track for recording the image data of one frame is not limited to ten or eleven, and an arbitrary number of track may be selected. The error correction operation may be performed after reproducing shuffling operation.

In the apparatus for recording and reproducing digital video signal of the embodiment, the arrangement of the macro blocks in the super block is decided in the input shuffling circuit 3. The decided arrangement of the macro blocks in the super block is changed in the successive data processing operation.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An apparatus for recording and reproducing a digital video signal comprising:

input shuffling means for
    dividing a video image into a first predetermined number of segments in a vertical direction and into a second predetermined number of segments in a horizontal direction in order to divide said video image into super blocks of a number corresponding to a product of said first predetermined number by said second predetermined number, dividing each super block into a fifth predetermined number of macro blocks each comprising data of a third predetermined number of horizontal pixel and a fourth predetermined number of vertical pixel, setting a predetermined order of said fifth predetermined number macro blocks in each super block so that said fifth predetermined number of macro blocks are consecutively arranged from one end to another end in each super block, setting a video segment comprising said second predetermined number of macro blocks belonging to different super blocks and having a same number in said predetermined order of macro blocks in each super block, and arranging said video segment as the unit of data processing;

coding means for generating coded data of which a variable length coding operation is applied to video data to limit an amount of said coded data to a predetermined amount of data for every video segment;

synchronizing block data generation means for generating synchronizing block data to store a main component of said coded data of one macro block of said video segment in one synchronizing block;

recording deshuffling means for rearranging said synchronizing block data so that a video image is divided horizontally into super block groups of said first predetermined number each having said second predetermined number of consecutive super blocks, data of said first predetermined number of super block groups are ordered from one end to another end on said video image, super blocks of said second predetermined number are ordered from one end to another end on said video image in each super block group, and said synchronizing block data are arranged in said predetermined order of said macro blocks in each super block; and recording means for recording said rearranged synchronizing block data on said first predetermined number of video tracks of a magnetic tape.

2. An apparatus for recording and reproducing a digital video signal in accordance with claim 1, wherein said input shuffling means arranges said macro blocks in an order of arrangement from macro blocks of a central part of said video image to macro blocks of a peripheral part thereof in each video segment.

3. An apparatus for recording and reproducing a digital video signal in accordance with claim 1, wherein said input shuffling means forms said video segment from a first macro block of a first super block located at a central part in said horizontal direction of said video image, a second macro block of a second super block and a third macro block of a third super block located at both sides of said first super block and a fourth macro block of a fourth super block and a fifth macro block of a fifth super block both located at peripheral parts in said horizontal direction of said video image of which said five super blocks are spaced apart from each other in said vertical direction of said video image, and a priority order in data processing operation is given to said five macro blocks in a manner that said priority order is gradually decreased from said first macro block to said fifth macro block;

said recording deshuffling means rearranges said synchronizing block data in said order of said super blocks arranged in said horizontal direction of said video image and said predetermined order of macro blocks in each super block.

4. An apparatus for recording and reproducing a digital video signal according to a 525/60 system of a television comprising:

input shuffling means for dividing a video image into 10 segments in a vertical direction and into 5 segments in a horizontal direction in order to divide said video image into 50 super blocks, dividing each super block into 27 macro blocks each comprising data of a first predetermined number of horizontal pixels and a second predetermined number of vertical pixels, setting an order of macro blocks in each super block so that a first macro block at an upper left-hand corner of each super block is given a first number and is represented by 0, subsequently, macro blocks arranged in said vertical direction with respect to first macro block are numbered in series in said vertical direction, a next number following a final macro block in said vertical direction is given to a macro block neighboring said final macro block in said horizontal direction, subsequently, a series of numbers are given to said macro blocks arranged in said vertical direction, and this above-mentioned operation is applied to all macro blocks in each super block, setting a video segment comprising 5 macro blocks belonging to super blocks which are different from each other so that a macro block is represented by $M_{i,j,k}$ and a video segment is represented by $V_{i,k}$, five macro blocks $M_{i,j,k}$ corresponding to a video segment $V_{i,k}$ are defined as, $$V_{i,k} = \{M_{(i+2)} \bmod 10,\ 2,\ k,$$
$$M_{(i+6)} \bmod 10,\ 1,\ k,$$
$$M_{(i+8)} \bmod 10,\ 3,\ k,$$
$$M_{(i+0)} \bmod 10,\ 0,\ k,$$
$$M_{(i+4)} \bmod 10,\ 4,\ k,\}$$
$$(i = 0, \ldots, 9; k = 0, \ldots, 26).$$

wherein (i+2) mod 10 in term I of subscripts of M represents a modulo operation for deriving a remainder by dividing a value of (i+2) by 10, values 2, 6, 8, 0 and 4 in respective parentheses being arbitrarily selected, arbitrary numerals in term J represent values of j for designating positions of said super blocks numbered with 0, 1, 2, 3 and 4 from a left end to a right end on said video image in said horizontal direction, and a term K represents a macro block number k in each super block, and arranging said video segment as a unit of data processing;

coding means for generating coded data of which a variable length coding operation is applied to video data to limit an amount of said coded data to a predetermined amount of data for every video segment;

synchronizing block data generation means for generating synchronizing block data to store a main component of said coded data of one macro block of said video segments in one synchronizing block;

recording deshuffling means for rearranging synchronizing block data $U_{i,j,k}$ corresponding to said macro block $M_{i,j,k}$ into order $T_i$ as follows $$T_i = \{ \; U_{i,0,0}, \; \ldots, \; U_{i,0,26},$$
$$U_{i,1,0}, \; \ldots, \; U_{i,1,26},$$
$$U_{i,2,0}, \; \ldots, \; U_{i,2,26},$$
$$U_{i,3,0}, \; \ldots, \; U_{i,3,26},$$
$$U_{i,4,0}, \; \ldots, \; U_{i,4,26} \; \}, \text{ and}$$
$$(i = 0, \ldots, 9)$$

recording means for recording said rearranged synchronizing block data on 10 video tracks of a magnetic tape.

5. An apparatus for recording and reproducing a digital video signal according to a 525/60 system of a television comprising:

input shuffling means for
dividing a video image into 10 segments in a vertical direction and into 5 segments in a horizontal direction in order to divide said video image into 50 super blocks, dividing each super block into 27 macro blocks each comprising data of 32 horizontal pixels and 8 vertical pixels of a luminance signal, 8 horizontal pixels and 8 vertical pixels of a color difference signal R-Y and 8 horizontal pixels and 8 vertical pixels of a color difference signal B-Y, setting an order of macro blocks in each super block so that a first macro block at an upper left-hand corner of each super block is given a first number and is represented by 0, subsequently, macro blocks arranged in said vertical direction with respect to said first macro block are numbered in series in said vertical direction, a next number following a final macro block in said vertical direction is given to a macro block neighboring said final macro block in said horizontal direction, subsequently, a series of numbers are given to said macro blocks arranged in said vertical direction, and this above-mentioned operation is applied to all macro blocks in each super block, setting a video segment comprising 5 macro blocks belonging to super blocks which are different from each other so that a macro block is represented by $M_{i,j,k}$ and a video segment is represented by $V_{i,k}$, five macro blocks $M_{i,j,k}$ corresponding to a video segment $V_{i,k}$ are defined as $$\overbrace{\phantom{XXXX}}^{I} \; \overbrace{\phantom{X}}^{J} \; \overbrace{\phantom{X}}^{K}$$
$$V_{i,k} = \{ M_{(i+2) \bmod 10}, \; 2, \; k,$$
$$M_{(i+6) \bmod 10}, \; 1, \; k,$$
$$M_{(i+8) \bmod 10}, \; 3, \; k,$$
$$M_{(i+0) \bmod 10}, \; 0, \; k,$$
$$M_{(i+4) \bmod 10}, \; 4, \; k \}$$
$$(i = 0, \ldots, 9; k = 0, \ldots, 26).$$

wherein (i+2) mod 10 in term I of subscripts of M represents a modulo operation for deriving a remainder by dividing a value of (i+2) by 10, values 2, 6, 8, 0 and 4 in respective parentheses being arbitrarily selected, arbitrary numerals in term J represent values of j for designating positions of said super blocks numbered with 0, 1, 2, 3 and 4 from a left end to a right end on said video image in said horizontal direction, and a term K represents a macro block number k in each super block, and arranging said video segment as a unit of data processing;

coding means for generating coded data of which a variable length coding operation is applied to video data to limit an amount of said coded data to a predetermined amount of data for every video segment;

synchronizing block data generation means for generating synchronizing block data to store a main component of said coded data of one macro block of said video segments in one synchronizing block;

recording deshuffling means for rearranging synchronizing block data $U_{i,j,k}$ corresponding to said macro block $M_{i,j,k}$ into order $T_i$ as follows $$T_i = \{ \; U_{i,0,0}, \; \ldots, \; U_{i,0,26},$$
$$U_{i,1,0}, \; \ldots, \; U_{i,1,26},$$
$$U_{i,2,0}, \; \ldots, \; U_{i,2,26},$$
$$U_{i,3,0}, \; \ldots, \; U_{i,3,26},$$
$$U_{i,4,0}, \; \ldots, \; U_{i,4,26} \; \}, \text{ and}$$
$$(i = 0, \ldots, 9)$$

recording means for recording said rearranged synchronizing block data on 10 video tracks of a magnetic tape.

6. An apparatus for recording and reproducing a digital video signal according to a 625/50 system of a television comprising:

input shuffling means for
dividing a video image into 12 segments in a vertical direction and into 5 segments in a horizontal direction in order to divide said video image into 60 super blocks, dividing each super block into 27 macro blocks each comprising data of a first predetermined number of horizontal pixels and a second predetermined number of vertical pixels, setting an order of macro blocks in each super block so that a first macro block at an upper left-hand corner of each super block is given a first number and is represented by 0, subsequently, macro blocks arranged in said vertical direction with respect to said first macro block are numbered in series in said vertical direction, a next number following a final macro block in said vertical direction is given to a macro block neighboring said final macro block in said horizontal direction, subsequently, a series of numbers are given to said macro blocks arranged in said vertical direction, and this above-mentioned operation is applied to all macro blocks in each super block, setting a video segment comprising 5 macro blocks belonging to super blocks which are different from each other so that a macro block is represented by $M_{i,j,k}$ and a video segment is represented by $V_{i,k}$, five macro blocks $M_{i,j,k}$ corresponding to a video segment $V_{i,k}$ are defined as, $$\overbrace{\phantom{XXXX}}^{I} \; \overbrace{\phantom{X}}^{J} \; \overbrace{\phantom{X}}^{K}$$
$$V_{i,k} = \{ M_{(i+2) \bmod 12}, \; 2, \; k,$$
$$M_{(i+6) \bmod 12}, \; 1, \; k,$$
$$M_{(i+8) \bmod 12}, \; 3, \; k,$$
$$M_{(i+0) \bmod 12}, \; 0, \; k,$$
$$M_{(i+4) \bmod 12}, \; 4, \; k \}$$
$$(i = 0, \ldots, 11; k = 0, \ldots, 26),$$

wherein (i+2) mod 12 in term I of subscripts of M represents a modulo operation for deriving a remainder by dividing a value of (i+2) by 12, values 2, 6, 8, 0 and 4 in respective parentheses being arbitrarily selected, arbitrary numerals in term J represent values of j for designating positions of said super blocks numbered with 0, 1, 2, 3 and 4 from a left end to a right end on said video image in said horizontal direction, and a term K represents a macro block number k in each super block, and arranging said video segment as a unit of data processing;

coding means for generating coded data of which a variable length coding operation is applied to video data to limit an amount of said coded data to a predetermined amount of data for every video segment;

synchronizing block data generation means for generating synchronizing block data to store a main component of said coded data of one macro block of said video segments in one synchronizing block;

recording deshuffling means for rearranging synchronizing block data $U_{i,j,k}$ corresponding to said macro block $M_{i,j,k}$ into order $T_i$ as follows $$T_i = \{ \quad U_{i,0,0}, \ldots, U_{i,0,26},$$
$$U_{i,1,0}, \ldots, U_{i,1,26},$$
$$U_{i,2,0}, \ldots, U_{i,2,26},$$
$$U_{i,3,0}, \ldots, U_{i,3,26},$$
$$U_{i,4,0}, \ldots, U_{i,4,26} \quad \}, \text{ and}$$
$$(i = 0, \ldots, 11)$$

recording means for recording said rearranged synchronizing block data on 12 video tracks of a magnetic tape.

7. An apparatus for recording and reproducing a digital video signal according to a 625/50 system of a television comprising:

input shuffling means for dividing a video image into 12 segments in a vertical direction and into 5 segments in a horizontal direction in order to divide said video image into 60 super blocks, dividing each super block into 27 macro blocks each comprising data of 16 horizontal pixels and 16 vertical pixels of a luminance signal, 8 horizontal pixels and 8 vertical pixels of a color difference signal R-Y and 8 horizontal pixels and 8 vertical pixels of a color difference signal B-Y, setting an order of macro blocks in each super block so that a first macro block at an upper left-hand corner of each super block is given a first number and is represented by 0, subsequently, macro blocks arranged in said vertical direction with respect to said first macro block are numbered in series in said vertical direction, a next number following a final macro block in said vertical direction is given to a macro block neighboring said final macro block in said horizontal direction, subsequently, a series of numbers are given to said macro blocks arranged upward in said vertical direction, and this above-mentioned operation is applied to all macro blocks in each super block, setting a video segment comprising 5 macro blocks belonging to super blocks which are different from each other so that a macro block is represented by $M_{i,j,k}$ and a video segment is represented by $V_{i,k}$, five macro blocks $M_{i,j,k}$ corresponding to a video segment $V_{i,k}$ are defined as, $$V_{i,k} = \{ \overbrace{M_{(i+2)} \bmod 12}^{I}, \overbrace{2}^{J}, \overbrace{k}^{K},$$
$$M_{(i+6)} \bmod 12, \quad 1, \quad k,$$
$$M_{(i+8)} \bmod 12, \quad 3, \quad k,$$
$$M_{(i+10)} \bmod 12, \quad 0, \quad k,$$
$$M_{(i+4)} \bmod 12, \quad 4, \quad k, \}$$
$$(i = 0, \ldots, 11; k = 0, \ldots, 26),$$

wherein (i+2) mod 12 in term I of subscripts of M represents a modulo operation for deriving a remainder by dividing a value of (i+2) by 12, values 2, 6, 8, 0 and 4 in respective parentheses being arbitrarily selected, arbitrary numerals in term J represent values of j for designating positions of said super blocks numbered with 0, 1, 2, 3 and 4 from a left end to a right end on said video image in said horizontal direction, and a term K represents a macro block number k in each super block, and arranging said video segment as a unit of data processing;

coding means for generating coded data of which a variable length coding operation is applied to video data to limit an amount of said coded data to a predetermined amount of data for every video segment;

synchronizing block data generation means for generating synchronizing block data to store a main component of said coded data of one macro block of said video segments in one synchronizing block;

recording deshuffling means for rearranging synchronizing block data $U_{i,j,k}$ corresponding to said macro block $M_{i,j,k}$ into order $T_i$ as follows $$T_i = \{ \quad U_{i,0,0}, \ldots, U_{i,0,26},$$
$$U_{i,1,0}, \ldots, U_{i,1,26},$$
$$U_{i,2,0}, \ldots, U_{i,2,26},$$
$$U_{i,3,0}, \ldots, U_{i,3,26},$$
$$U_{i,4,0}, \ldots, U_{i,4,26} \quad \}, \text{ and}$$
$$(i = 0, \ldots, 11)$$

recording means for recording said rearranged synchronizing block data on 12 video tracks of a magnetic tape.

* * * * *